United States Patent
Suzuki

(10) Patent No.: US 10,187,468 B2
(45) Date of Patent: Jan. 22, 2019

(54) INFORMATION COMMUNICATION APPARATUS, INFORMATION COMMUNICATION METHOD AND PROGRAM STORAGE MEDIUM

(71) Applicant: Olympus Corporation, Shibuya-ku, Tokyo (JP)

(72) Inventor: Takeshi Suzuki, Akiruno (JP)

(73) Assignee: Olympus Corporation, Tokyo (JP)

( * ) Notice: Subject to any disclaimer, the term of this patent is extended or adjusted under 35 U.S.C. 154(b) by 566 days.

(21) Appl. No.: 14/884,108

(22) Filed: Oct. 15, 2015

(65) Prior Publication Data
US 2016/0036914 A1 Feb. 4, 2016

Related U.S. Application Data

(63) Continuation of application No. PCT/JP2014/005660, filed on Mar. 13, 2014.

(30) Foreign Application Priority Data

Apr. 19, 2013 (JP) ................................. 2013-088726

(51) Int. Cl.
*G06F 3/0484* (2013.01)
*H04L 29/08* (2006.01)
(Continued)

(52) U.S. Cl.
CPC ........ *H04L 67/1097* (2013.01); *G06F 3/0484* (2013.01); *G06F 17/30203* (2013.01);
(Continued)

(58) Field of Classification Search
CPC .... G06F 21/6218; G06F 3/0484; G06F 21/35; G06F 17/30067; H04L 67/42; H04L 29/06
(Continued)

(56) References Cited

U.S. PATENT DOCUMENTS 7,490,348 B1 * 2/2009 Harris ................. H04L 63/0428
713/153
8,695,081 B2 * 4/2014 Bansal ................. H04L 63/102
726/11
(Continued)

FOREIGN PATENT DOCUMENTS

EP 2479702 7/2012
JP 2005-339273 12/2005
(Continued)

OTHER PUBLICATIONS

International Search Report to International Application No. PCT/JP2014/056660, dated May 27, 2014 (1 pg.) with English translation (1 pg.).
(Continued)

*Primary Examiner* — Marcin R Filipczyk
(74) *Attorney, Agent, or Firm* — John C. Pokotylo; Pokotylo Patent Services

(57) ABSTRACT

The invention provides an information communication apparatus that discloses, on a network channel, an electronic file in a public region provided in a connected storage apparatus, causes the network channel to operate when the public region is accessible or stops the network channel when the public region is inaccessible and stops the network channel when the storage apparatus is connected for the first time irrespective of whether or not the public region is accessible.

4 Claims, 11 Drawing Sheets

(51) Int. Cl.
  *H04L 29/06*   (2006.01)
  *H04W 12/08*   (2009.01)
  *G06F 21/60*   (2013.01)
  *G06F 17/30*   (2006.01)
  *H04W 48/02*   (2009.01)

(52) U.S. Cl.
  CPC ............ *G06F 21/606* (2013.01); *H04L 67/42* (2013.01); *H04W 12/08* (2013.01); *H04W 48/02* (2013.01)

(58) Field of Classification Search
  USPC .......................................... 707/827; 713/176
  See application file for complete search history.

(56) References Cited

U.S. PATENT DOCUMENTS

2008/0010685 A1* 1/2008 Holtzman .......... G06F 12/1483
                                                           726/27
2012/0173670 A1    7/2012 Shinada

FOREIGN PATENT DOCUMENTS

| JP | 2006-202012 | 8/2006 |
| JP | 2012-160104 | 8/2012 |
| WO | WO 2011-033636 | 3/2011 |

OTHER PUBLICATIONS

First Office Action to corresponding Chinese Patent Application No. 201480021376.9, dated Mar. 14, 2018, (6 pgs.).

\* cited by examiner

INFORMATION COMMUNICATION APPARATUS, INFORMATION COMMUNICATION METHOD AND PROGRAM STORAGE MEDIUM

CROSS REFERENCE TO RELATED APPLICATION

This application is a continuation application of PCT/JP2014/056660 filed on Mar. 13, 2014 and claims benefit of Japanese Application No. 2013-088726 filed in Japan on Apr. 19, 2013, the entire contents of which are incorporated herein by this reference.

BACKGROUND OF THE INVENTION

1. Field of the Invention

The present invention relates to an information communication apparatus, an information communication method and a program storage medium configured to make an electronic file releasable to the public on a network channel.

2. Description of the Related Art

There are information communication apparatuses configured to be connectable to a network channel such as a wireless LAN and enabled to disclose an electronic file such as an image or document on a network channel to share the file with other external devices. Such an information communication apparatus is disclosed, for example, in Japanese Patent Application Laid-Open Publication No. 2006-202012. The information communication apparatus disclosed in Japanese Patent Application Laid-Open Publication No. 2006-202012 can change whether or not to disclose an electronic file to the public on a network channel.

In recent years, a function of accessing a network channel is even added to image pickup apparatuses such as digital cameras and external storage apparatuses such as hard disk drives, flash memory cards, and these devices are enabled to function as information communication apparatuses.

SUMMARY OF THE INVENTION

An information communication apparatus according to an aspect of the present invention includes a communication section that is communicable with one or a plurality of external devices via one or a plurality of network channels and assigns a different piece of identification information to the one or each of the plurality of wireless network channels, a storage apparatus connection section that can change whether or not to make a connection with one or a plurality of storage apparatuses configured to be able to store an electronic file and perform inputting/outputting with the storage apparatus, a storage region management section that provides, in the storage apparatus, a public region in which the electronic file is disclosed to a network channel assigned with the predetermined piece of identification information among the one or each of the plurality of network channels, a storage apparatus management section that detects whether or not the public region is accessible via the storage apparatus connection section, and a communication control section configured to cause, when the storage apparatus management section determines that the public region is accessible, the network channel assigned with the predetermined piece of identification information to operate, cause, when the storage apparatus management section determines that the public region is inaccessible, the network channel assigned with the predetermined piece of identification information not to operate, and cause, when the storage apparatus is connected to the storage apparatus connection section for a first time, the network channel assigned with the predetermined piece of identification information not to operate irrespective of the determination of the storage apparatus management section.

An information communication method according to another aspect of the present invention is an information communication method using an information communication apparatus provided with a communication section that is communicable with one or a plurality of external devices via one or a plurality of network channels and configured to assign a different piece of identification information to the one or each of the plurality of wireless network channels, a storage apparatus connection section that can change whether or not to make a connection with one or a plurality of storage apparatuses configured to be able to store an electronic file and perform inputting/outputting with the storage apparatus, and a storage region management section configured to be able to provide, in the storage apparatus, a public region in which the electronic file is disclosed to a network channel assigned with the predetermined piece of identification information among the one or each of the plurality of network channels, the method including a step of detecting whether or not the storage apparatus is connected to the storage apparatus connection section for the first time, a step of detecting whether or not the public region is accessible via the storage apparatus connection section, and a step of causing, when the storage apparatus is connected to the storage apparatus connection section for the first time, the network channel assigned with the predetermined piece of identification information not to operate, causing, when the storage apparatus is not connected to the storage apparatus connection section for the first time and the public region is accessible, the network channel assigned with the predetermined piece of identification information to operate, and causing, when the storage apparatus is not connected to the storage apparatus connection section for the first time and the public region is inaccessible, the network channel assigned with the predetermined piece of identification information not to operate.

A program storage medium according to a further aspect of the present invention is a program storage medium storing a program for controlling an information communication apparatus provided with a communication section that is communicable with one or a plurality of external devices via one or a plurality of network channels and configured to assign a different piece of identification information to the one or each of the plurality of wireless network channels, a storage apparatus connection section that can change whether or not to make a connection with one or a plurality of storage apparatuses configured to be able to store an electronic file and perform input/output with the storage apparatus, and a storage region management section configured to be able to provide, in the storage apparatus, a public region in which the electronic file is disclosed to a network channel assigned with the predetermined piece of identification information among the one or each of the plurality of network channels, the program including a step of detecting whether or not the storage apparatus is connected to the storage apparatus connection section for a first time, a step of detecting whether or not the public region is accessible via the storage apparatus connection section, and a step of causing, when the storage apparatus is connected to the storage apparatus connection section for the first time, the network channel assigned with the predetermined piece of identification information not to operate, causing, when the storage apparatus is not connected to the storage apparatus connection section for the first time and the public region is accessible, the network channel assigned the predetermined identification information to operate, and causing, when the storage apparatus is not connected to the storage apparatus connection section for the first time and the public region is inaccessible, the network channel assigned with the predetermined piece of identification information not to operate.

DETAILED DESCRIPTION OF THE PREFERRED EMBODIMENTS

Figure 1:
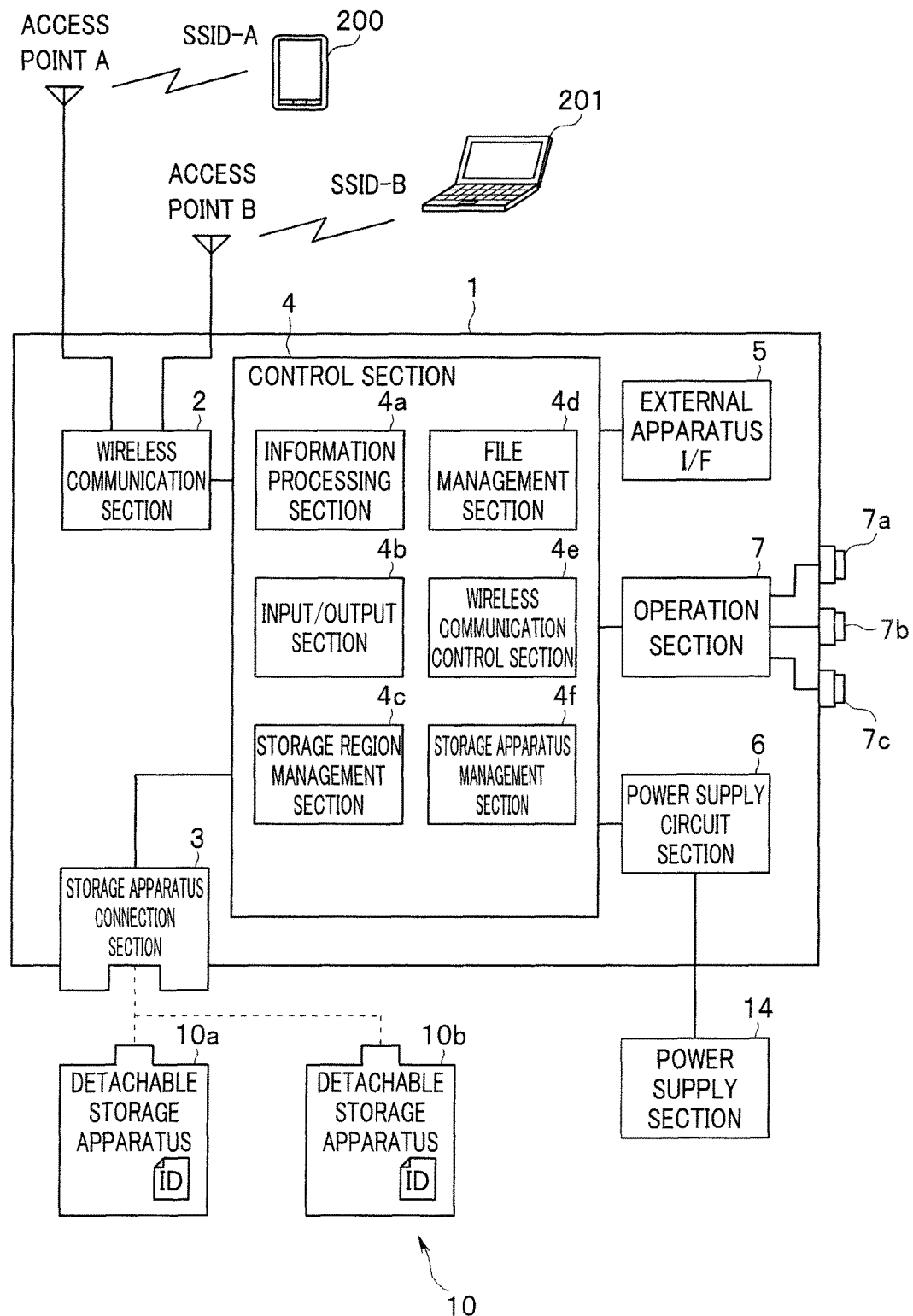
FIG. 1 is a diagram for describing a configuration of an information communication apparatus according to a first embodiment.

Hereinafter, preferred embodiments of the present invention will be described with reference to the accompanying drawings. Note that in drawings used in the following description, scaling is made to differ from one component to another to illustrate the respective components on the order of size recognizable on the drawings, and the present invention is not limited to only the quantity of components, shapes of components, ratio in size of the components and relative positional relationship between the components described in the drawings.

(First Embodiment)

An information communication apparatus 1 is configured by including, as shown in FIG. 1, a power supply circuit section 6, a control section 4, a storage apparatus connection section 3, an external apparatus interface 5 and a wireless communication section (communication section) 2.

The power supply circuit section 6 is configured to be connectable to a power supply section 14 which is a battery, commercial power supply or the like configured to be able to supply power and configured to supply the power supplied from the power supply section 14 to each component making up the information communication apparatus 1. The power supply section 14 may be a battery detachably attached to the information communication apparatus 1 or incorporated therein or may be a power output section of another electronic device connected to the information communication apparatus 1. Note that the power supply circuit section 6 may be provided with a switch for switching on/off a power supply to the information communication apparatus 1.

The control section 4 is configured by including a calculation apparatus (CPU), a storage apparatus (RAM), an auxiliary storage apparatus and an input/output apparatus or the like, and has a configuration of controlling operation of the information communication apparatus 1 based on a predetermined program. A more specific configuration of the control section 4 will be described later.

The storage apparatus connection section 3 is configured to be electrically connectable to a storage apparatus 10 configured to be able to record an electronic file (hereinafter simply referred to as "file") which is electronic data such as image data, speech data or document data, and configured to be able to control operation of the storage apparatus 10.

The storage apparatus 10 is a flash memory or hard disk drive or the like. The storage apparatus connection section 3 may also be configured in a mode that allows a plurality of storage apparatuses 10 to be simultaneously connected thereto. Furthermore, the storage apparatus 10 may be configured in a mode that allows the storage apparatus 10 to be detachably attached to the information communication apparatus 1 or fixed inside the information communication apparatus 1.

In the present embodiment, the storage apparatus 10 is, for example, a flash memory configured to be detachably attached to the information communication apparatus 1. Hereinafter, the storage apparatus 10 configured to be detachably attached to the information communication apparatus 1 and connectable to the storage apparatus connection section 3 will be referred to as a "detachable storage apparatus." In the present embodiment, as shown in FIG. 1, different detachable storage apparatuses 10a and 10b can be attached to the information processing apparatus 1. The storage apparatus connection section 3 has a shape that allows the detachable storage apparatuses 10a and 10b to be inserted therein. Note that in cases where the detachable storage apparatuses 10a and 10b need not be particularly distinguished from each other, these are simply referred to as storage apparatuses 10.

The information communication apparatus 1 can write, read, change, erase or search a file into/from the storage apparatus 10, using a file system of a predetermined format via the storage apparatus connection section 3.

The external apparatus interface 5 is configured to be able to communicate electronic data with another electronic device, electronic circuit or electronic part which is an external apparatus via wired or wireless communication means in a predetermined communication format.

The communication format of the external apparatus interface 5 is not particularly limited, but may be a serial communication format or parallel communication format. The external apparatus interface 5 may have a dedicated mode provided according to a specific electronic device, electronic circuit or electronic part or may also have a general-purpose mode such as USB (universal serial bus) or Bluetooth (registered trademark).

The information communication apparatus 1 can input electronic data inputted from an external apparatus to the control section 4 or cause the storage apparatus 10 to store the electronic data via the external apparatus interface 5.

Conversely, the information communication apparatus 1 can output electronic data outputted from the control section 4 or electronic data stored in the storage apparatus 10 to an external apparatus via the external apparatus interface 5.

The wireless communication section 2 is configured to be able to communicate electronic data with an external device which is another electronic device different from the information communication apparatus 1 via wired communication means or wireless communication means in a predetermined format. The wireless communication section 2 is configured to be communicable with the external device via a plurality of network channels and assign respective pieces of identification information to the plurality of network channels.

In the present embodiment, the wireless communication section 2 is configured to be able to wirelessly communicate with the external device using wireless LAN based on well-known standards such as IEEE802.11a, IEEE802.11b, IEEE802.11g or IEEE802.15 as an example. Hereinafter, a network channel to which the wireless communication section 2 is connected will be referred to as a "wireless network."

In the present embodiment, the wireless communication section 2 can serve as access points of a plurality of wireless LANs which are a plurality of wireless networks and the plurality of wireless LAN access points are each assigned an SSID (service set identification) as different pieces of identification information.

To be more specific, in the present embodiment, the wireless communication section 2 is configured to be able to serve as a wireless LAN access point A having an SSID of "SSID-A" and a wireless LAN access point B having an SSID of "SSID-B." Hereinafter, the wireless LAN having an SSID of "SSID-A" is called a "wireless network A," and the wireless LAN having an SSID of "SSID-B" is called a "wireless network B." Note that the SSID-A and SSID-B may be notified around it in a so-called "broadcast state" or not notified around it in a so-called "stealth state."

Here, the wireless network A and the wireless network B may or may not be encrypted. In the present embodiment, the wireless network A is not encrypted as an example and any given external devices are allowed to participate in the network without requiring authentication. On the other hand, the wireless network B is encrypted based on a known standard and external devices are not allowed to participate in the network without entering a predetermined pass phrase.

Note that the SSID of a wireless network for which the wireless communication section 2 serves as an access point, a setting as to whether or not the wireless network is encrypted and a pass phrase may be fixed or may be changed by the user.

The operation portion 7 is for the user to input an operational instruction on the information communication apparatus 1, and is configured by including, for example, a push button switch, a slide switch, a dial switch and a touch sensor. In the present embodiment, the operation portion 7 is configured by including a power supply operation switch 7a for switching on/off a power supply to the information communication apparatus 1, a wireless communication changeover switch 7b for determining whether or not to operate the wireless communication section 2, and a wireless communication changeover operation selection switch 7c.

The wireless communication changeover operation selection switch 7c is intended to determine, in the information communication apparatus 1, whether or not to operate the wireless communication section 2 based on an instruction from the user or automatically determine whether or not to operate the wireless communication section 2 based on a determination of the control section 4 which will be described later. Here, an operating mode in which the information communication apparatus 1 determines whether or not to operate the wireless communication section 2 based on an instruction from the user which is inputted via the wireless communication changeover switch 7b is called a "manual changeover mode." On the other hand, an operating mode in which the information communication apparatus 1 determines whether or not to operate the wireless communication section 2 based on a determination of the control section 4 is called an "automatic changeover mode."

Note that a part or a whole of the operation portion 7 may be implemented in a mode in which the user selects a menu displayed as icons or characters displayed on the image display apparatus so as to input an instruction to the information communication apparatus 1, so-called "GUI" (graphical user interface). For example, the wireless communication changeover switch 7b may be configured in a mode in which whether or not to select an icon or menu displayed on the image display apparatus is associated with whether or not to operate the wireless communication section 2. Furthermore, for example, the wireless communication changeover operation selection switch 7c may be configured in a mode in which whether or not to select an icon or menu displayed on the image display apparatus is associated with selection states of the automatic changeover mode and the manual changeover mode. Note that the operation portion 7 may be detachably attached to the information communication apparatus 1.

Next, more details of the control section 4 and operation of the information communication apparatus 1 under the control of the control section 4 will be described. The control section 4 is configured by including an input/output section 4b, a storage apparatus management section 4f, a storage region management section 4c, a file management section 4d, a wireless communication control section (communication control section) 4e, and an information processing section 4a.

The input/output section 4b is a region that controls communication between the control section 4 and the respective components of the information communication apparatus 1.

The storage apparatus management section 4f is configured to be able to detect whether or not the storage apparatus 10 is connected to the storage apparatus connection section 3. The configuration of the storage apparatus management section 4f is not particularly limited, but may be configured in a mode in which the presence or absence of the storage apparatus 10 is mechanically detected using a push switch or the like or may be configured in a mode in which the presence or absence of the storage apparatus 10 is electrically detected based on the presence or absence of an electrical connection between the storage apparatus connection section 3 and the storage apparatus 10.

The storage apparatus management section 4f of the present embodiment determines, for example, when a signal in a predetermined format can be transmitted/received between the information communication apparatus 1 and the storage apparatus 10, that the storage apparatus 10 is connected to the storage apparatus connection section 3 or determines, when a signal in a predetermined format cannot be transmitted/received, that the storage apparatus 10 is not connected to the storage apparatus connection section 3. Note that the signal in a predetermined format may simply indicate electrical conduction between the storage apparatus connection section 3 and the storage apparatus 10. The signal in a predetermined format may also be communication in a predetermined format between the control section 4 and the storage apparatus 3.

More specifically, the storage apparatus management section 4f determines, when the control section 4 can access the storage apparatus 10 via the storage apparatus connection section 3, that the storage apparatus 10 is connected to the storage apparatus connection section 3, and determines, when the control section 4 cannot access the storage apparatus 10 via the storage apparatus connection section 3, that the storage apparatus 10 is not connected to the storage apparatus connection section 3.

The storage apparatus management section 4f is configured to be able to identify each individual storage apparatus 10 connected to the storage apparatus connection section 3. More specifically, the storage apparatus management section 4f is configured to be able to recognize a unique identifier ID assigned to each individual storage apparatus 10, recognize the identifier ID and store the identifier ID or information corresponding to the identifier ID.

The unique identifier ID assigned to the storage apparatus 10 is, for example, a serial number defined by a manufacturer of the storage apparatus 10 and stored in a non-rewritable (non-volatile) storage region of the storage apparatus 10. Note that the identifier ID is not limited to one defined by the manufacturer of the storage apparatus 10, but may be generated by the information communication apparatus 1 and stored in the storage region of the storage apparatus 10, for example.

The identifier ID of the storage apparatus 10 recognized by the storage apparatus management section 4f or information corresponding to the identifier ID is stored in, for example, a non-volatile storage section such as a flash memory provided in the control section 4.

The storage apparatus management section 4f compares a connected storage apparatus table and the identifier ID of the storage apparatus 10 connected to the current storage apparatus connection section 3, and thereby determines whether or not the storage apparatus 10 connected to the current storage apparatus connection section 3 is one connected in the past.

The storage region management section 4c is configured to provide a public region RO and a non-public region RC in the storage apparatus 10 connected to the storage apparatus connection section 3.

The public region RO is made up of one or a plurality of regions that can store a given number of files. The non-public region RC can store a given number of files and is made up of one or a plurality of regions different from the public region RO.

Here, the format for distinguishing between the public region RO and the non-public region RC is not particularly limited. For example, the public region RO and the non-public region RC are different directories (folders) in a file system configured in the storage apparatus 10, and may be made up of a plurality of regions having logically different public region ROs and non-public region RCs. For example, the public region RO and the non-public region RC may be made up of a plurality of partitions obtained by logically dividing the storage region of the identical storage apparatus 10. Moreover, the public region RO and the non-public region RC may be physically different regions provided in the identical storage apparatus 10. The public region RO and the non-public region RC may also be apparent regions made up of a set of files divided based on a value of meta data.

The public region RO may be automatically formed when the storage apparatus 10 is initialized in the information communication apparatus 1 or formed when an instruction from the user is received.

Figure 2:
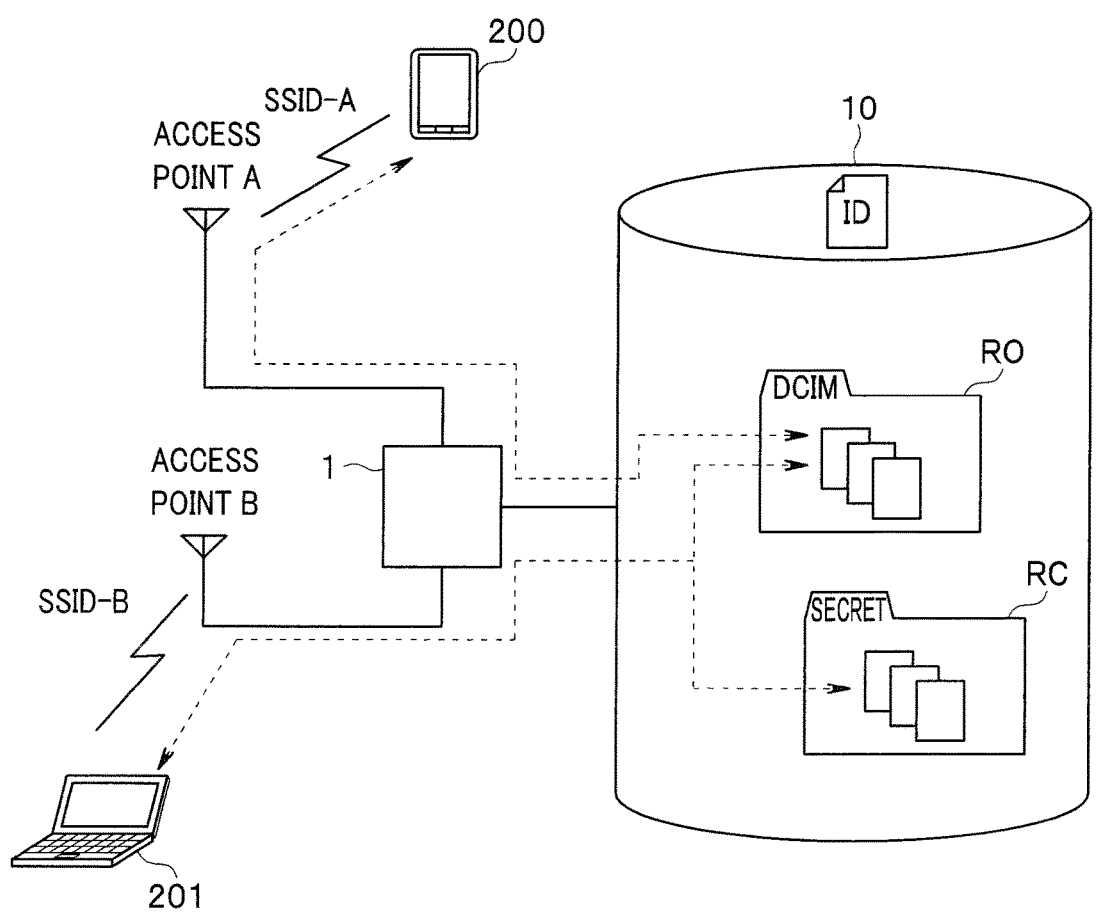
FIG. 2 is a schematic view for describing a public region and a non-public region.

As an example of the present embodiment, as shown in FIG. 2, the number of storage apparatuses 10 connected to the storage apparatus connection section 3 is one and the public region RO and the non-public region RC are two different directories provided in the storage region of the storage apparatus 10. In the present embodiment shown in FIG. 2, the directory name which is the public region RO is "DCIM" and the directory name which is the non-public region RC is "SECRET."

The storage region management section 4c is configured to be able to disclose a file stored in the storage apparatus 10 connected to the storage apparatus connection section 3 on a wireless network for which the wireless communication section 2 serves as an access point according to predetermined conditions. In other words, the storage region management section 4c is configured to be able to control whether or not the file stored in the storage apparatus 10 is accessible from an external device connected via the wireless communication section 2. That is, the storage region management section 4c has a function as a file server.

More specifically, the storage region management section 4c is configured to disclose files stored in the public region RO on a wireless network assigned predetermined first identification information and not to disclose files stored in the non-public region RC on a wireless network assigned the first identification information. Here, the first identification information is SSID which is "SSID-A" in the present embodiment.

Therefore, in the present embodiment, the storage region management section 4c operates so as to disclose only files stored in the public region RO on the wireless network A having an SSID of "SSID-A" and operates so as not to disclose files stored in the non-public region RC on the wireless network A. That is, an external device 200 participating in the wireless network A can access files stored in the public region RO, but cannot access files stored in the non-public region RC.

As described above, in the information communication apparatus 1 of the present embodiment, if, for example, the user saves a file in the public region RO of the storage apparatus 10 and operates the wireless communication section 2 and the storage region management section 4c, it is possible to disclose the file to the peripheral external device 200 via the wireless network A. Here, as described above, since the wireless network A is not encrypted and external devices can freely participate in the wireless network A without requiring authentication, the external device 200 can freely access files stored in the public region RO while the wireless communication section 2 and the storage region management section 4c are in operation.

In the present embodiment, the storage region management section 4c is configured to be able to disclose files stored in the public region RO and the non-public region RC on a wireless network assigned second identification information which is different from the first identification information. The second identification information is an SSID which is "SSID-B" in the present embodiment.

Therefore, in the present embodiment, the storage region management section 4c operates so as to disclose files stored in the public region RO and the non-public region RC on the wireless network B whose SSID is "SSID-B." That is, an external device 201 participating in the wireless network B can access files stored in both the public region RO and the non-public region RC.

Figure 3:
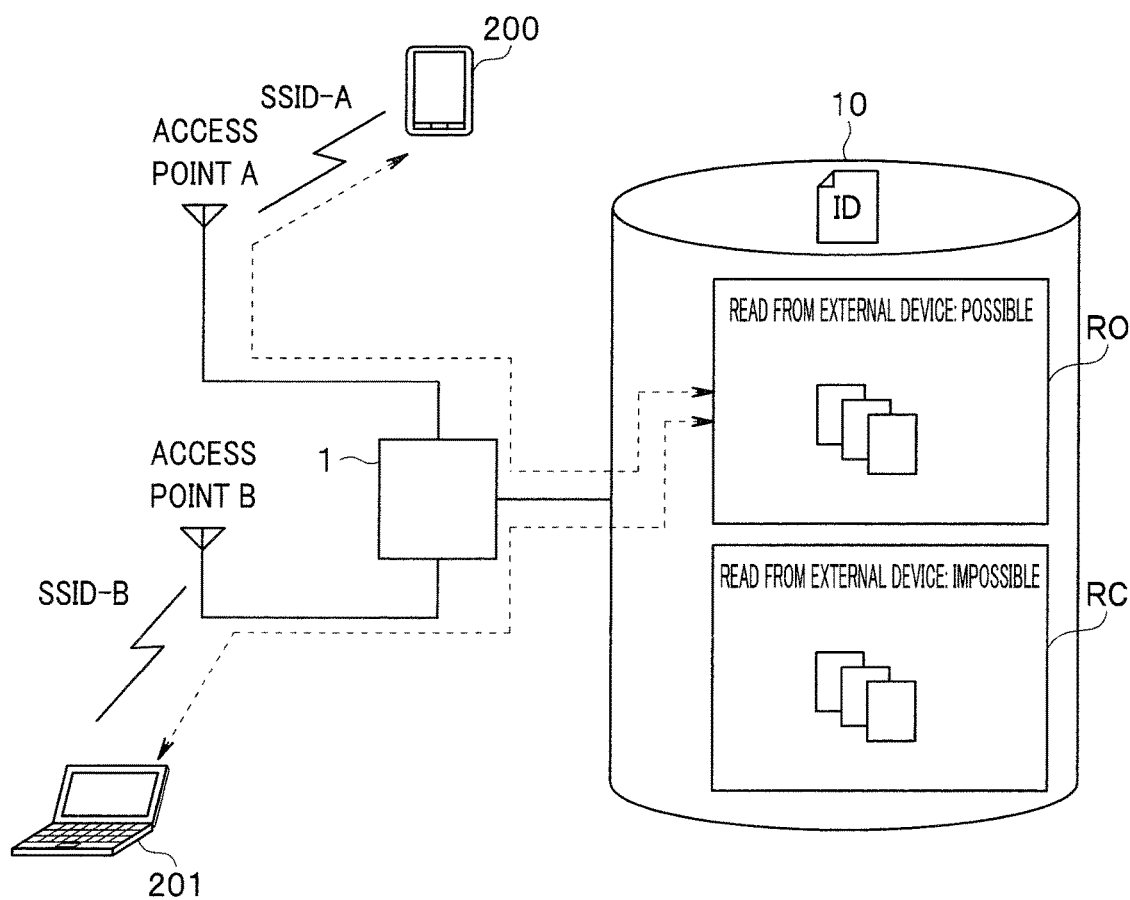
FIG. 3 is a schematic view for describing a modification of the public region and the non-public region.

Note that the present embodiment assumes that the public region RO and the non-public region RC are designated as a "DCIM" directory and a "SECRET" directory respectively, but the mode in which a region is divided into the public region RO and the non-public region RC is not limited to the one based on the difference in directories as described above. For example, as shown in FIG. 3, on a file system or on an interface when an external device accesses the information communication apparatus 1, an apparent region which is a set of files that can be read from the external device may be the public region RO and an apparent region which is a set of files that cannot be read from the external device may be the non-public region RC. In the mode shown in FIG. 3, the public region RO is configured by including files to which meta data indicating that the files are readable from an external device is added and the non-public region RC is configured by including files to which meta data indicating that the files are not readable from an external device is added.

As described above, the wireless network B is encrypted and is configured so that an external device cannot participate therein without entering a predetermined pass phrase. Therefore, according to the information communication apparatus 1 of the present embodiment, among files stored in the storage apparatus 10, it is possible to disclose a file stored in the non-public region RC inaccessible from the external terminal 200 to a specific authenticated external device 201.

The file management section 4d is configured to be able to perform operation such as creation, change, deletion or movement of directories or files in the storage region of the storage apparatus 10. The file management section 4d is configured to be able to rewrite meta data added to a file.

The wireless communication control section 4e is configured to be able to control the operation of the wireless communication section 2. The wireless communication control section 4e determines whether or not to supply power to the wireless communication section 2 or determines whether or not to operate an access point of the wireless communication section 2.

The information processing section 4a is configured to control operation of each component of the information communication apparatus 1 according to a predetermined program.

Figure 4:
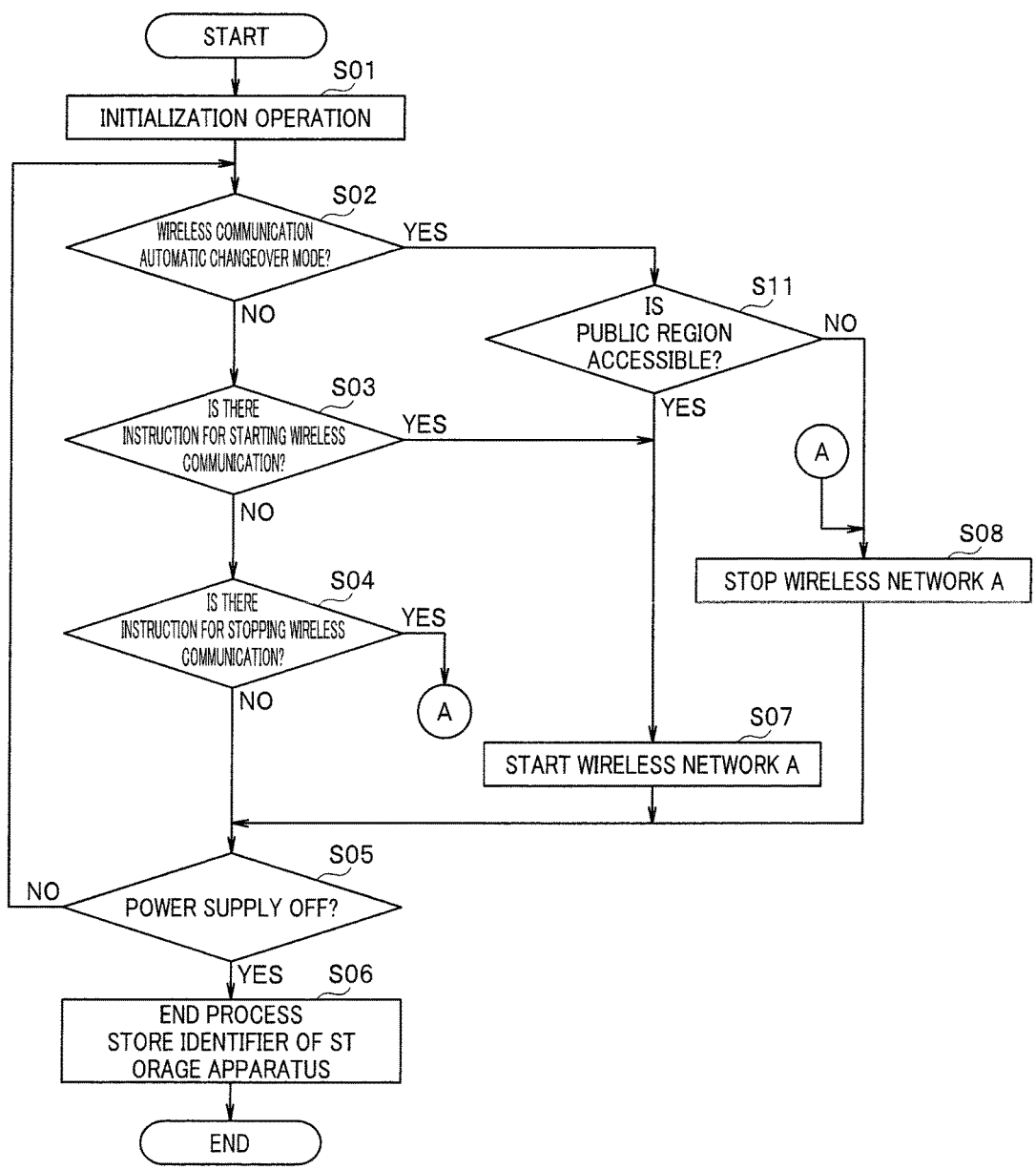
FIG. 4 is a flowchart illustrating operation of the information communication apparatus according to the first embodiment.

A process shown in FIG. 4 is started when the power supply section 14 starts a power supply to the information communication apparatus 1. In the present embodiment, a power supply from the power supply section 14 to the information communication apparatus 1 is started, for example, by the user operating the power supply operation switch 7a.

In step S01, an initialization operation is executed first which is necessary to start components making up the information communication apparatus 1. When the initialization operation in step S01 is completed, the power supply to the wireless communication section 2 is assumed to be stopped.

Next, in step S02, it is determined whether or not an automatic changeover mode is selected by the wireless communication changeover operation selection switch 7c. When it is determined that an automatic changeover mode in which whether or not to operate the wireless communication section 2 is automatically determined by the wireless communication changeover operation selection switch 7c is not selected, the flow proceeds to step S03. That is, the flow proceeds to step S03 when a manual changeover mode is selected by the wireless communication changeover operation selection switch 7c.

In step S03, the wireless communication changeover switch 7b is operated and it is determined whether or not an instruction for starting operation of the wireless communication section 2 is inputted. Note that since the present embodiment is configured to start the wireless network A and the wireless network B by operating the wireless communication section 2, it is possible to paraphrase that step S03 is a step of determining whether or not an instruction for starting the wireless network A is inputted. In step S03, when it is determined that an instruction for starting operation of the wireless communication section 2 is not inputted, the flow proceeds to step S04.

In step S04, the wireless communication changeover switch 7b is operated and it is determined whether or not an instruction for stopping the wireless communication section 2 is inputted. That is, it is determined in step S04 whether or not an instruction for stopping the wireless network A is inputted. When it is determined in step S04 that an instruction for stopping the wireless communication section 2 is not inputted, the flow proceeds to step S05.

In step S05, it is determined whether or not an instruction for switching off the power to the information communication apparatus 1 is inputted. In the present embodiment, an instruction for switching off the power to the information communication apparatus 1 is inputted, for example, by the user operating the power supply operation switch 7a.

Note that the instruction for switching off the power to the information communication apparatus 1 may be automatically generated by the control section 4 when the control section 4 determines that a predetermined condition is satisfied. For example, when the operation portion 7 is not operated for a predetermined time or longer or when a predetermined signal is inputted via the external apparatus interface 5, the control section 4 may generate an instruction for switching off the power to the information communication apparatus 1.

In step S05, when it is determined that an instruction for switching off the power to the information communication apparatus 1 is not inputted, the flow returns to step S02. That is, when a manual changeover mode is selected by the wireless communication changeover operation selection switch 7c, the flow waits until the wireless communication changeover switch 7b or the power supply operation switch 7a is operated as shown in steps S03, S04 and S05.

When the power supply operation switch 7a is operated and it is determined that an instruction for switching off the power to the information communication apparatus 1 is inputted (step S05: YES), the flow proceeds to step S06 to execute an end process of switching off the power to the information communication apparatus 1.

On the other hand, when the wireless communication changeover switch 7b is operated and it is determined that an instruction for starting operation of the wireless communication section 2 is inputted (step S03: YES), the flow proceeds to step S07 to start operation of the wireless communication section 2 and start the wireless network A and the wireless network B. The flow then proceeds to step S05.

When the wireless communication changeover switch 7b is operated and it is determined that an instruction for stopping operation of the wireless communication section 2 is inputted (step S04: YES), the flow proceeds to step S08 to stop operation of the wireless communication section 2 and stop the wireless network A and the wireless network B. The flow then proceeds to step S05.

As described above, when the manual changeover mode is selected by the wireless communication changeover operation selection switch 7c, whether or not to operate the wireless communication section 2 is selected based on the instruction manually inputted from the user by the wireless communication changeover switch 7b.

On the other hand, when it is determined in step S02 that the automatic changeover mode is selected by the wireless communication changeover operation selection switch 7c, the flow proceeds to step S11.

In step S11, it is determined whether or not the storage apparatus 10 is connected to the storage apparatus connection section 3. This determination is made by the storage apparatus management section 4f. To be more specific, in the present embodiment, the storage apparatus management section 4f determines whether or not the storage apparatus 10 is connected to the storage apparatus connection section 3 depending on whether or not the public region RO of the storage apparatus 10 is accessible or a file in the public region RO is accessible via the storage apparatus connection section 3.

In step S11, if the public region RO of the storage apparatus 10 is accessible via the storage apparatus connection section 3, it is determined that the storage apparatus 10 is connected to the storage apparatus connection section 3 and the flow proceeds to step S07. In step S07, the wireless communication section 2 starts operating and starts the wireless network A and the wireless network B. The flow proceeds to step S05.

Furthermore, in step S11, if the public region RO of the storage apparatus 10 is inaccessible via the storage apparatus connection section 3, it is determined that the storage apparatus 10 is not connected to the storage apparatus connection section 3 and the flow proceeds to step S08. In step S08, the operation of the wireless communication section 2 is stopped, and the wireless network A and the wireless network B are stopped. The flow then proceeds to step S05. In step S11, when the connected storage apparatus 10 does not match information indicating the saved storage apparatus (identifier ID), for example, when it is detected that another storage apparatus is newly attached, it is determined that the public region RO is inaccessible. Then, the flow proceeds to step S08 to stop the wireless network A. After this, the flow proceeds to step S05. In step S05, if the power is not turned off, the flow proceeds to step S02.

If the safe mode is determined in step S02 as described above, the flow proceeds to step S03 to check whether or not an instruction for starting wireless communication is inputted as in the case of manual changeover. Here, when an instruction for starting wireless communication is inputted, the wireless communication changeover mode is returned from the safe mode to the automatic changeover mode and the flow proceeds to step S07.

Note that in step S11, if the storage apparatus 10 including no public region RO is connected to the storage apparatus connection section 3, since the public region RO is inaccessible, as a result of the determination in step S11, the flow proceeds to step S08.

As described so far, the information communication apparatus 1 of the present embodiment is configured by including the wireless communication section 2 configured to be communicable with an external device via the wireless network A assigned identification information of SSID-A and the wireless network B assigned identification information of SSID-B, the storage apparatus connection section 3 that performs input/output with the storage apparatus 10 and the control section 4.

Furthermore, the control section 4 is configured by including the storage region management section 4c configured to provide the public region RO in which files are disclosed on the wireless network A and the non-public region RC in which files are not disclosed on the wireless network A, in the storage apparatus 10, the storage apparatus management section 4f that detects whether or not the public region RO of the storage apparatus 10 is accessible, and the wireless communication control section 4e that controls operation of the wireless communication section 2.

Figure 5:
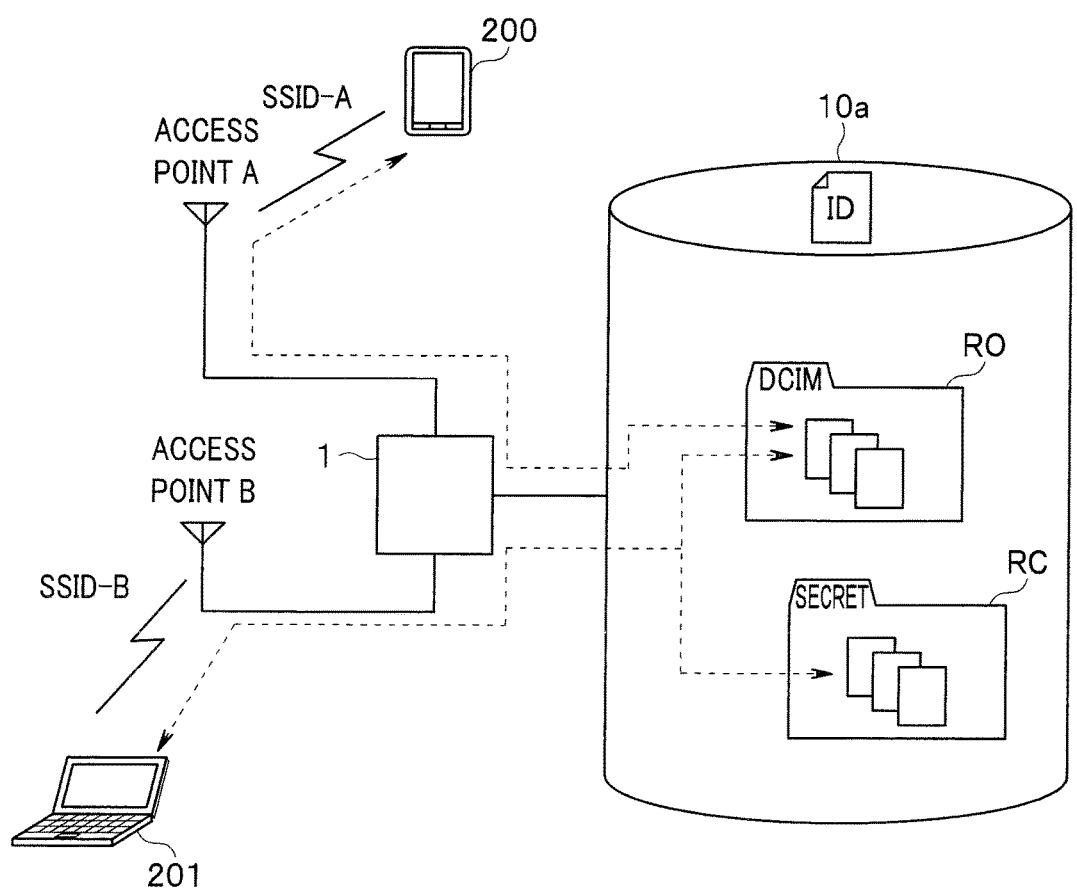
FIG. 5 is a schematic view for describing operation of the information communication apparatus according to the first embodiment.

For example, when a detachable storage apparatus 10a provided with the public region RO is connected as shown in FIG. 5, the wireless communication control section 4e automatically operates the wireless networks A and B via the wireless communication section 2. When this detachable storage apparatus 10a is removed from the information communication apparatus 1, the wireless communication control section 4e automatically stops the wireless network A via the wireless communication section 2.

Figure 6:
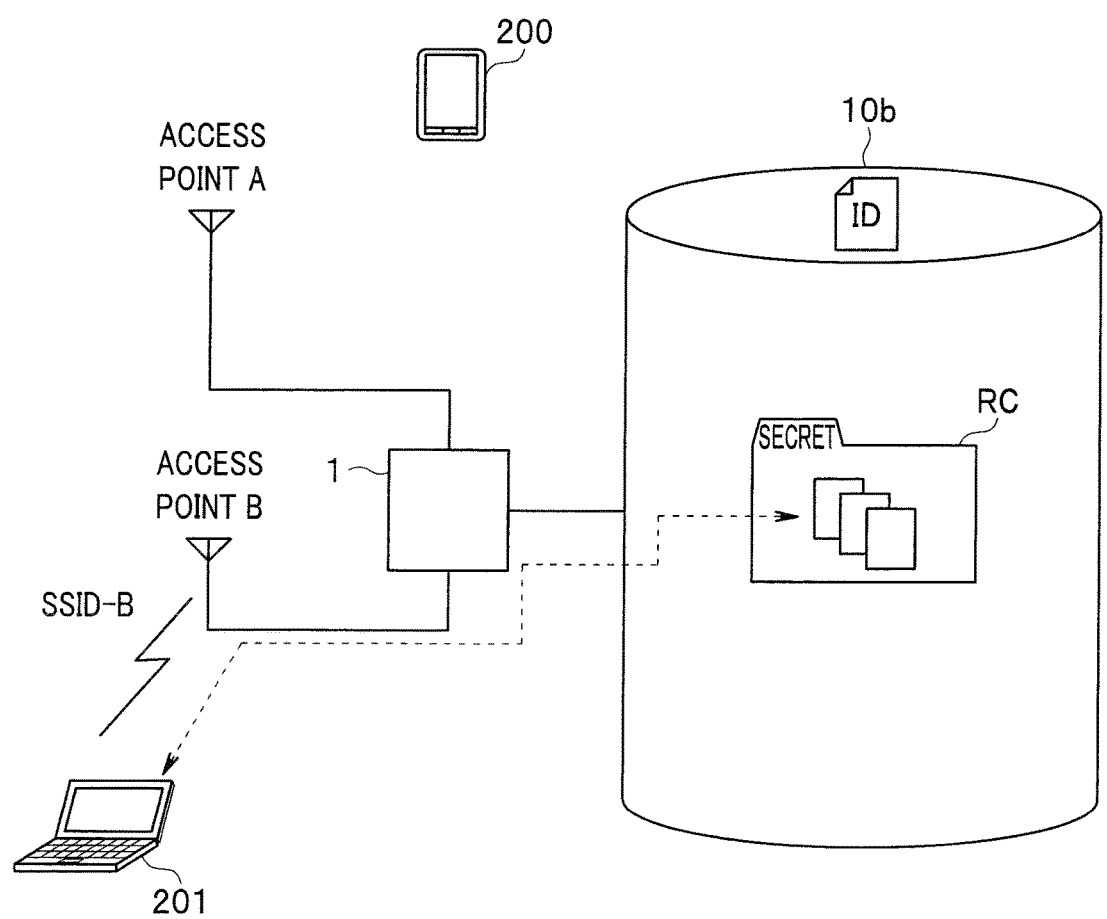
FIG. 6 is a schematic view for describing operation of the information communication apparatus according to the first embodiment.

For example, as shown in FIG. 6, when the detachable storage apparatus 10b without provision of any public region RO is connected, the public region RO is inaccessible, and therefore the wireless communication control section 4e stops the wireless network A via the wireless communication section 2. In other words, when the public region RO is inaccessible, the wireless communication control section 4e is configured not to operate the wireless network A via the wireless communication section 2.

Thus, according to the present embodiment, when the public region RO is inaccessible, since the wireless network A via the wireless communication section 2 is stopped, it is possible to avoid operation of the wireless network via the wireless communication section 2 when there is no file disclosable on the wireless network and reduce power consumption. The information communication apparatus 1 according to the present embodiment automatically starts, when the storage apparatus 10 provided with the public region RO is connected to the storage apparatus connection section 3, operation of the wireless network via the wireless communication section 2 and starts disclosure of a file on the wireless network, and can thereby save labor of the user. At this time, in initial access when the storage apparatus 10 is attached for the first time, it is possible to confirm with the user as to whether or not to disclose a file and thereby prevent the file from being disclosed mistakenly.

The information communication apparatus 1 according to the present embodiment described above is applicable to various file handling electronic devices. For example, the information communication apparatus 1 is applicable to a portable communication terminal which is connectable to a wireless LAN or the like. The information communication apparatus 1 is also applicable to an image pickup apparatus in a mode generally called an "electronic camera" or "digital camera." Hereinafter, an example where the information communication apparatus 1 is applied to an image pickup apparatus 100 will be described with reference to FIG. 7.

The image pickup apparatus 100 is configured such that an image pickup section 11 provided with an image sensor such as a CCD or CMOS sensor picks up at least one of a still image and a movie and stores the image in the storage apparatus 10 as a file. The storage apparatus 10 is a flash memory, for example, and is configured to be at least either detachably attached to the image pickup apparatus 100 or fixed to within the image pickup apparatus 100.

The image pickup section 11 includes an image pickup lens, an image sensor and an image processing section or the like and is configured to be able to convert an optical image formed by the image pickup lens to image data. Note that the image pickup section 11 includes at least one of a microphone and a microphone connection section, and may be configured to be able to generate speech data. The image pickup section 11 may be detachably attached to the image pickup apparatus 100. Since the configuration for implementing image pickup operation of the image pickup apparatus 100 is a known technique, detailed description thereof will be omitted.

In the present embodiment, the information communication apparatus 1 is, for example, incorporated as part of the configuration of the image pickup apparatus 100. A part of or a whole of the configuration of the aforementioned information communication apparatus 1 is disposed so as to also serve as the configuration necessary for the operation of the image pickup apparatus 1.

More specifically, in the present embodiment, the control section 4 of the information communication apparatus 1 has a function of controlling operation of each component of the image pickup apparatus 100. That is, the function of the control section 4 of the information communication apparatus 1 is mounted on the control section of the image pickup apparatus 100 in a mode like software, middleware or hardware.

The external apparatus interface 5 functions not only as an internal bus that electrically connects the control section 4 and the image pickup section 11 but also as an external bus that connects an external apparatus which is not shown. Note that the external apparatus interface 5 may be connectable to a personal computer or the like which is an external device via USB.

The image pickup apparatus 100 can write a file to the storage apparatus 10 or read a file stored in the storage apparatus 10 by way of the storage apparatus connection section 3. The image data picked up by the image pickup section 11 is stored in the storage apparatus 10 as a file in a predetermined format.

The operation portion 7 is constructed of, for example, a push button switch, a dial switch or a touch sensor for the user to input an instruction for operation of the image pickup apparatus 100. To be more specific, the operation portion 7 is constructed of a release switch for instructing execution of a photographing operation, a power supply operation switch 7a for switching on/off the power to the image pickup apparatus 100, a wireless communication changeover switch 7b for determining whether or not to operate the wireless communication section 2 and a wireless communication changeover operation selection switch 7c or the like.

Switching on/off of the power supply to the image pickup apparatus 100 by the power supply operation switch 7a corresponds to switching on/off of the power supply to the information communication apparatus 1. Note that the operation portion 7 may be provided with an acceleration sensor or a gyroscope and detect a predetermined postural change of the image pickup apparatus 100 as input of an instruction by the user.

A display section 13 is configured by including an image display apparatus made up of a liquid crystal display apparatus or an organic EL display apparatus or the like. The display section 13 displays image data picked up by the image pickup apparatus 100, identification information (SSID), and a menu or the like to set operation conditions of the image pickup apparatus 100 and the information communication apparatus 1 singly or in combination with some thereof, according to necessity. Note that the display section 13 may not include any image display apparatus and may display operation states of the image pickup apparatus 100 and the information communication apparatus 1 according to a change in the lighting state of one or a plurality of LEDs. Moreover, the image pickup apparatus 100 may not be provided with any display section 13. It is possible to notify the user of the operation state of the image pickup apparatus 100 through this display section 13.

The power supply circuit section 6 is configured to be connectable to the power supply section 14 which is an AC/DC converter connected to a commercial power supply or a battery or the like and supplies power from the power supply section 14 to each member making up the image pickup apparatus 100. In the present embodiment, the power supply section 14 is a secondary battery, for example, and is accommodated in the image pickup apparatus 100. Note that the power supply section 14 may be fixed in the image pickup apparatus 100 or may be detachably attached to the image pickup apparatus 100.

In the image pickup apparatus 100 described above, a file of an image picked up by the image pickup section 11 is stored in the public region RO of the storage apparatus 10.

When the automatic changeover mode is selected, the image pickup apparatus 100 of the present embodiment can reduce power consumption because the wireless communication section 2 is stopped when the storage apparatus 10 is removed. Furthermore, when the storage apparatus 10 is connected to the storage apparatus connection section 3, the image pickup apparatus 100 of the present embodiment can automatically start operation of the wireless communication section 2, start disclosure of a file on a wireless network, and can thereby save labor of the user. At this time, in initial access when the storage apparatus 10 is attached for the first time, it is possible to confirm with the user as to whether or not to disclose the file and thereby prevent the file from being disclosed mistakenly.

(Second Embodiment)

Next, a second embodiment of the present invention will be described. Note that only differences from the first embodiment will be described below and components identical to those of the first embodiment will be assigned identical reference numerals and description thereof will be omitted as appropriate.

Figure 8:
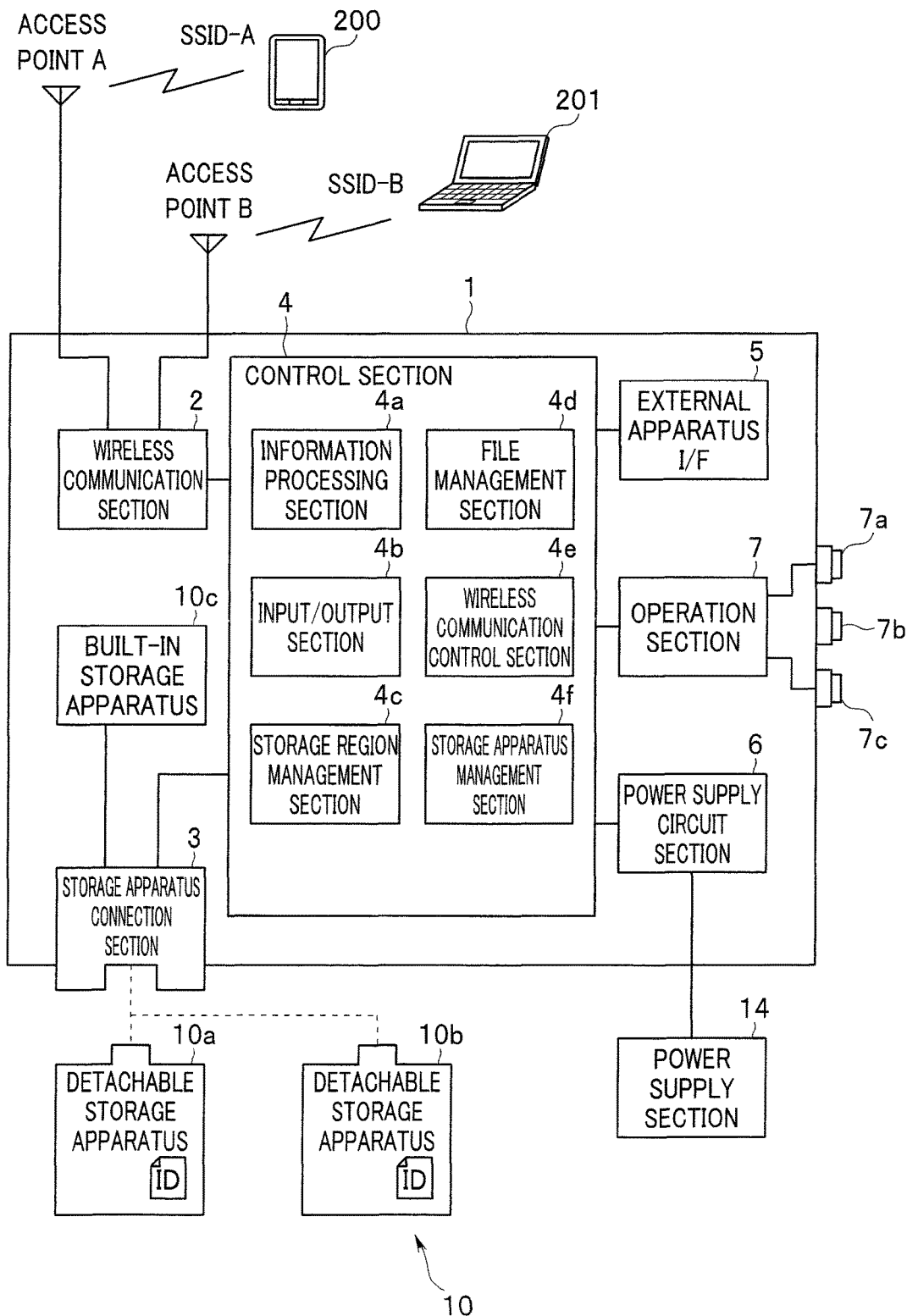
FIG. 8 is a diagram for describing a configuration of an information communication apparatus according to a second embodiment.

In the aforementioned first embodiment, the storage apparatus 10 is detachably attached to the information communication apparatus 1, whereas in the present embodiment, as shown in FIG. 8, the storage apparatus 10 includes a built-in storage apparatus 10c which is incorporated in the information communication apparatus 1.

Figure 7:
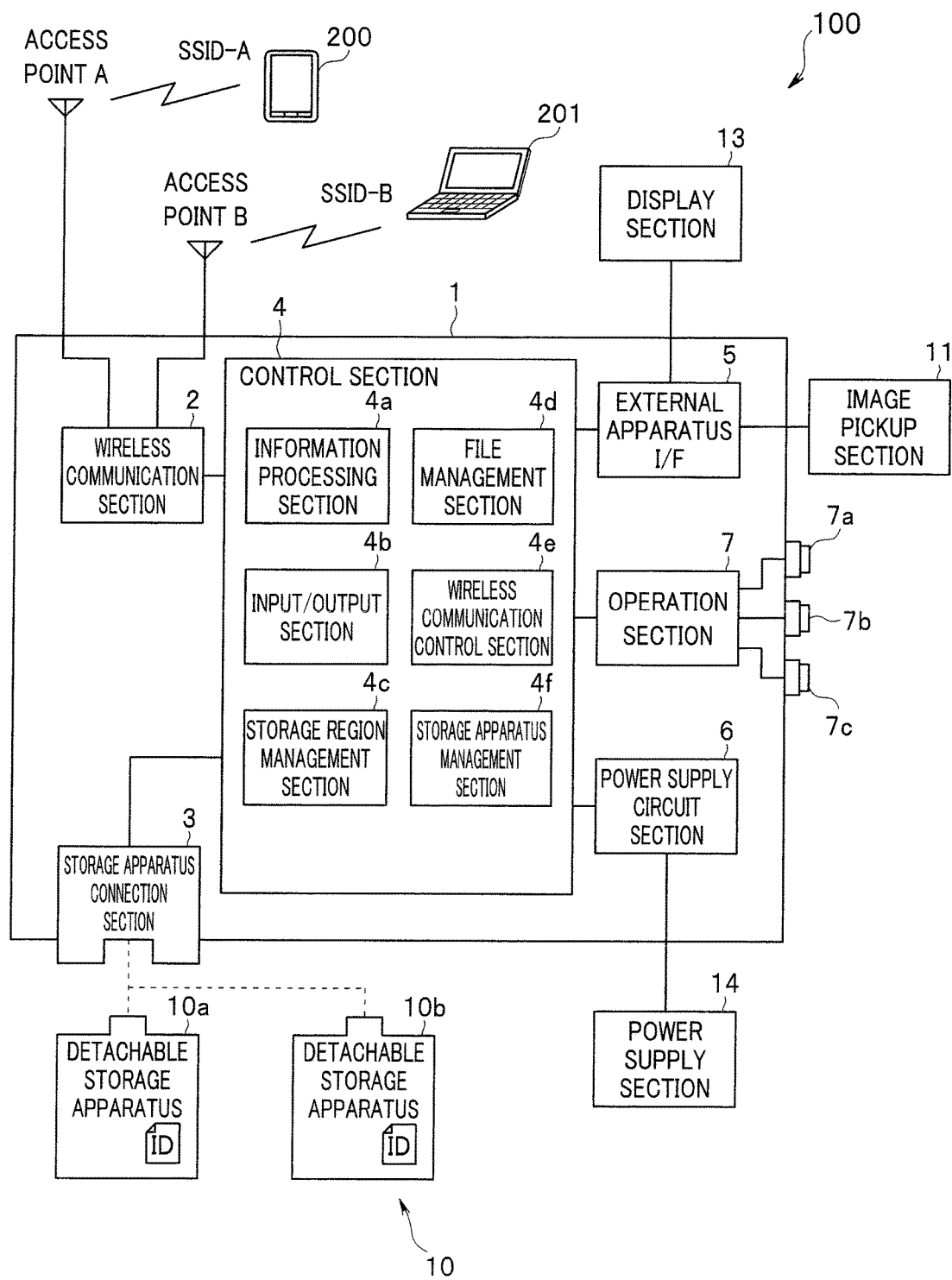
FIG. 7 is a diagram for describing a configuration of an image pickup apparatus according to the first embodiment.

The built-in storage apparatus 10c is a storage apparatus fixed to the information communication apparatus 1 and connected to the storage apparatus connection section 3. The built-in storage apparatus 10c is, for example, a flash memory or hard disk drive and is disposed so that the user cannot remove it from the information communication apparatus 1. The rest of the configuration of the information communication apparatus 1 is similar to that of the first embodiment shown in FIG. 1 or FIG. 7. That is, the information communication apparatus 1 of the present modification may be applied to the image pickup apparatus 100 as shown in FIG. 7.

Operation of the information communication apparatus 1 of the present embodiment is similar to the flowchart shown in FIG. 4. Therefore, if the public region RO is provided in at least one of the built-in storage apparatus 10c and the detachable storage apparatuses attached to the information communication apparatus 1, the wireless communication control section 4e automatically operates the wireless networks A and B via the wireless communication section 2. On the other hand, if the public region RO is provided in neither the built-in storage apparatus 10c nor the detachable storage apparatuses attached to the information communication apparatus 1, the wireless communication control section 4e stops the wireless network A via the wireless communication section 2.

The information communication apparatus 1 of the present embodiment configured as described above stops the wireless network A via the wireless communication section 2 when the public region RO is inaccessible, as in the first embodiment, and can thereby avoid operation of the wireless network A via the wireless communication section 2 while there is no file that can be disclosed on the wireless network and can thereby reduce power consumption. In initial access with the storage apparatus 10 in which the public region RO is provided connected to the storage apparatus connection section 3, the information communication apparatus 1 of the present embodiment can confirm with the user as to whether or not to disclose a file, and can thereby prevent the file from being disclosed mistakenly. The image pickup apparatus 100 provided with the information communication apparatus 1 of the present embodiment also has similar effects.

(Third Embodiment)

Next, a third embodiment the present invention will be described. Note that only differences from the first embodiment and the second embodiment will be described below and components identical to those of the first embodiment and the second embodiment will be assigned identical reference numerals and description thereof will be omitted as appropriate. This embodiment further includes a safe mode as a wireless communication mode indicating a case where the detachable storage apparatus 10 provided with the public region RO is connected without information indicating that the detachable storage apparatus 10 is one already connected in the past. The case where the detachable storage apparatus 10 provided with the public region RO is connected without information indicating that the detachable storage apparatus 10 is one already connected in the past is namely a case where the storage apparatus 10 is connected for the first time.

The storage apparatus management section 4f of the information communication apparatus 1 of the present embodiment is configured to be able to identify the individual storage apparatus 10 connected to the storage apparatus connection section 3.

More specifically, the storage apparatus management section 4f recognizes a unique identifier ID assigned to each individual storage apparatus 10 and is configured to be able to store the identifier ID for a predetermined period. The unique identifier ID assigned to the storage apparatus 10 is, for example, a serial number defined by a manufacturer of the storage apparatus 10 and is stored in a non-rewritable (non-volatile) storage region of the storage apparatus 10. Note that the identifier ID is not limited to the one defined by the manufacturer of the storage apparatus 10, but may be generated by the information communication apparatus 1 and stored in the storage apparatus 10.

In the present embodiment, the predetermined period during which the storage apparatus management section 4f stores identifier IDs of all the connected storage apparatuses 10 is a period until the power supply to the information communication apparatus 1 is turned off. Note that the storage apparatus management section 4f may store identifier IDs of the connected storage apparatuses 10 for a predetermined time period such as 24 hours or one week.

Thus, the storage apparatus management section 4f recognizes a unique identifier ID assigned to each individual storage apparatus 10, stores the ID for a predetermined period, and can thereby determine whether or not the storage apparatuses 10 connected to the storage apparatus connection section 3 are ones connected for a predetermined period in the past.

Suppose the identifier IDs of the storage apparatuses 10 connected to the storage apparatus connection section 3 are stored in the connected storage apparatus table. In the present embodiment, this connected storage apparatus table is reset when power is supplied to the information communication apparatus 1.

Operation of the information communication apparatus 1 of the present embodiment will be described with reference to a flowchart shown in FIG. 9.

Figure 9:
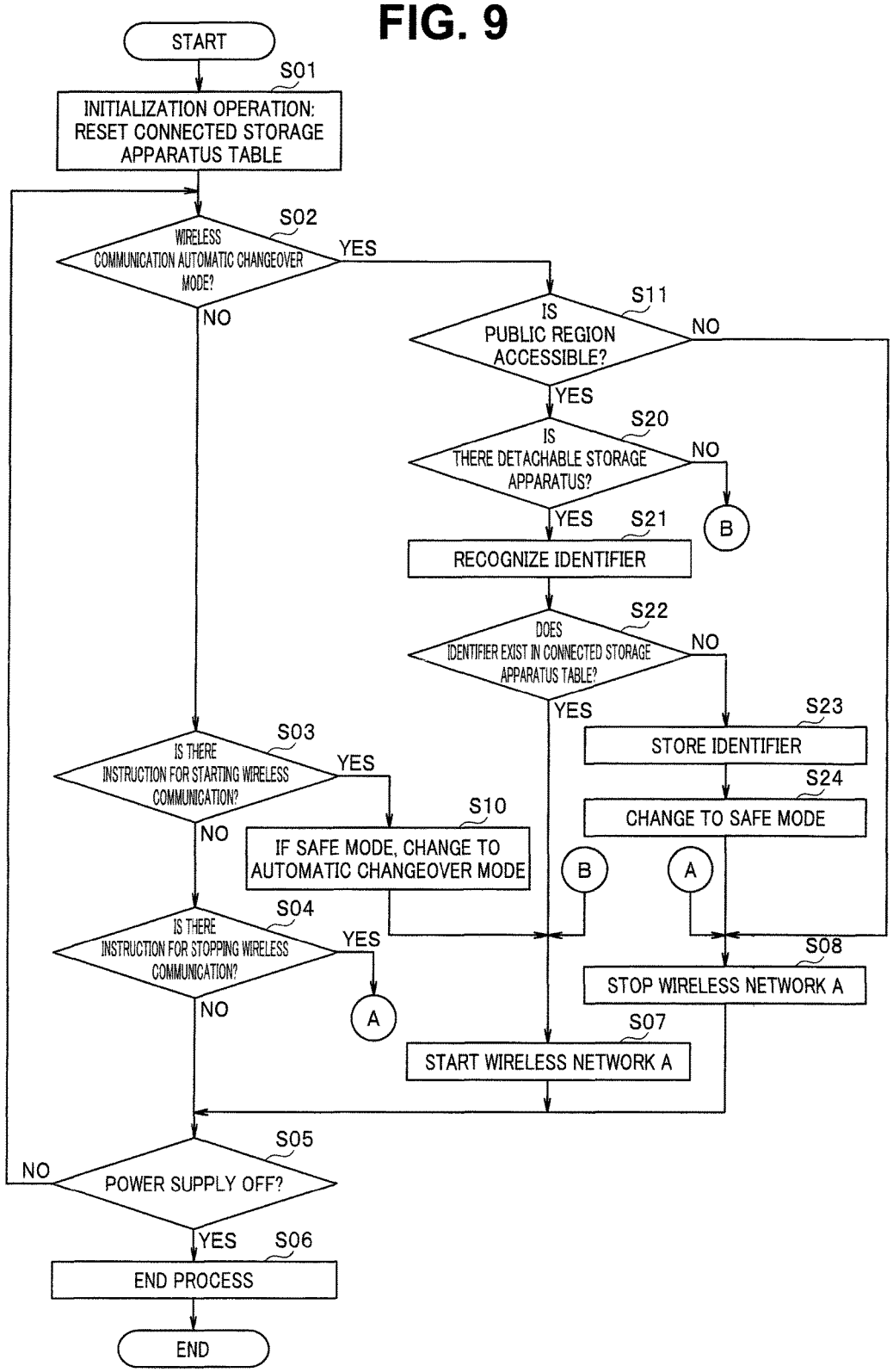
FIG. 9 is a flowchart illustrating operation of an information communication apparatus according to a third embodiment.

The process shown in FIG. 9 is started when a power supply to the information communication apparatus 1 from the power supply section 14 is started. In the present embodiment, for example, when the user operates the power supply operation switch 7a, the power supply to the information communication apparatus 1 from the power supply section 14 is started.

First, in step S01, an initialization operation necessary to start the regions making up the information communication apparatus 1 is executed. In step S01, the connected storage apparatus table stored in the storage apparatus management section 4f is reset. In the present embodiment, when the initialization operation in step S01 is completed, the power supply to the wireless communication section 2 is stopped.

Next, in step S02, it is determined whether or not the automatic changeover mode is selected through the wireless communication changeover operation selection switch 7c. When it is determined that the automatic changeover mode which automatically determines whether or not to operate the wireless communication section 2 is not selected using the wireless communication changeover operation selection switch 7c, the flow proceeds to step S03. That is, when the manual changeover mode is selected by the wireless communication changeover operation selection switch 7c, the flow proceeds to step S03. Note that an example of the case where it is determined in step S02 that the mode is not the wireless communication changeover mode is a safe mode. The flow proceeds to step S03 in this case, too. The safe mode will be described later.

In step S03, the wireless communication changeover switch 7b is operated and it is determined whether or not an instruction for starting operation of the wireless communication section 2 is inputted. Note that since the present embodiment is configured so that the wireless network A and the wireless network B are started by the wireless communication section 2 operating, it can be paraphrased that step S03 is a step of determining whether or not an instruction for starting the wireless network A is inputted. When it is determined in step S03 that no instruction for starting operation of the wireless communication section 2 is inputted, the flow proceeds to step S04.

In step S04, the wireless communication changeover switch 7b is operated and it is determined whether or not an instruction for stopping the wireless communication section 2 is inputted. That is, it is determined in step S04 whether or not an instruction for stopping the wireless network A is inputted. When it is determined in step S04 that no instruction for stopping the wireless communication section 2 is inputted, the flow proceeds to step S05.

It is determined in step S05 whether or not an instruction to turn off the power supply to the information communication apparatus 1 has been inputted. In the present embodiment, an instruction for switching off the power supply to the information communication apparatus 1 is inputted, for example, when the user operates the power supply operation switch 7a.

Note that when the control section 4 determines that predetermined conditions have been satisfied, the instruction for switching off the power supply to the information communication apparatus 1 may be automatically generated by the control section 4. For example, the control section 4 may issue an instruction to switch off the power supply to the information communication apparatus 1 when the operation portion 7 is not operated for a predetermined time or longer or when a predetermined signal is inputted via the external apparatus interface 5.

When it is determined in step S05 that an instruction for switching off the power supply to the information communication apparatus 1 is not inputted, the flow returns to step S02. That is, when the manual changeover mode is selected by the wireless communication changeover operation selection switch 7c, as shown in steps S03, S04 and S05, the system waits until the wireless communication changeover switch 7b or the power supply operation switch 7a is operated.

When the power supply operation switch 7a is operated and it is determined that an instruction for switching off the power supply to the information communication apparatus 1 is inputted (step S05: YES), the flow proceeds to step S06 and an end process of switching off the power supply to the information communication apparatus 1 is executed.

On the other hand, when the wireless communication changeover switch 7b is operated and it is determined that an instruction for starting operation of the wireless communication section 2 is inputted (step S03: YES), the flow proceeds to step S07, starting operation of the wireless communication section 2 and starting the wireless network A and the wireless network B. The flow proceeds to step S05.

Furthermore, when the wireless communication changeover switch 7b is operated and it is determined that an instruction for stopping operation of the wireless communication section 2 is inputted (step S04: YES), the flow proceeds to step S08, stopping the operation of the wireless communication section 2 and stopping the wireless network A and the wireless network B. The flow then proceeds to step S05.

As described above, when the manual changeover mode is selected by the wireless communication changeover operation selection switch 7c, whether or not to operate the wireless communication section 2 is selected based on manual instruction input from the user using the wireless communication changeover switch 7b.

On the other hand, in the determination in step S02, when it is determined by the wireless communication changeover operation selection switch 7c that the automatic changeover mode is selected, the flow proceeds to step S11.

In step S11, it is determined whether or not the storage apparatus 10 is connected to the storage apparatus connection section 3. This determination is made by the storage apparatus management section 4f. To be more specific, in the present embodiment, the storage apparatus management section 4f determines whether or not the storage apparatus 10 is connected to the storage apparatus connection section 3 depending on whether or not the public region RO of the storage apparatus 10 is accessible via the storage apparatus connection section 3. Note that the storage apparatus 10 is not limited to the detachable storage apparatus 10a or 10b, but may include the built-in storage apparatus 10c.

In step S11, when it is determined that the public region RO of the storage apparatus 10 is inaccessible via the storage apparatus connection section 3, the flow proceeds to step S08, stopping the operation of the wireless communication section 2 and stopping the wireless network A and the wireless network B. The flow then proceeds to step S05.

In step S11, when it is determined that the public region RO of the storage apparatus 10 is accessible via the storage apparatus connection section 3, the flow proceeds to step S20. In step S20, it is determined whether or not any detachable storage apparatus is connected to the storage apparatus connection section 3.

In step S20, when it is determined that no detachable storage apparatus is connected to the storage apparatus connection section 3, the flow proceeds to step S07, starting the operation of the wireless communication section 2 and starting the wireless network A and the wireless network B. The flow then proceeds to step S05.

On the other hand, in step S20, when it is determined that a detachable storage apparatus is connected to the storage apparatus connection section 3, the flow proceeds to step S21. In step S21, an identifier ID of the detachable storage apparatus connected to the storage apparatus connection section 3 is recognized. The flow then proceeds to step S22.

In step S22, it is determined whether or not the identifier ID of the detachable storage apparatus recognized in previous step S21 already exists in the connected storage apparatus table. In step S22, if it is determined that the identifier ID of the detachable storage apparatus recognized in previous step S21 already exists in the connected storage apparatus table, the flow proceeds to step S07, starting the operation of the wireless communication section 2 and starting the wireless network A and the wireless network B. The flow then proceeds to step S05.

That is, if the currently connected detachable storage apparatus is one connected to the information communication apparatus 1 for a predetermined period in the past, the operation of the wireless communication section 22 is started.

On the other hand, in step S22, when if it is determined that the identifier ID of the detachable storage apparatus recognized in step S21 does not already exist in the connected storage apparatus table, the flow proceeds to step S23, storing the identifier ID in the connected storage apparatus table. The flow then proceeds to step S24, switching the wireless communication mode from the wireless communication changeover mode to the safe mode. The flow proceeds to step S08, stopping the operation of the wireless communication section 2 and stopping the wireless network A and the wireless network B. The flow then proceeds to step S05.

That is, when the currently connected detachable storage apparatus is one which has not been connected to the information communication apparatus 1 for a predetermined period in the past, the mode is changed to a safe mode indicating that it is a first connection and the operation of the wireless communication section 22 is stopped.

As described so far, the information communication apparatus 1 of the present embodiment is configured by including the wireless communication section 2 configured to be communicable with an external device via the wireless network A assigned identification information of SSID-A and the wireless network B assigned identification information of SSID-B, the storage apparatus connection section 3 that performs input/output with the storage apparatus 10 and the control section 4.

The control section 4 is configured by including the storage region management section 4c configured to provide the storage apparatus 10 with the public region RO that discloses files on the wireless network A and the non-public region RC that does not disclose files on the wireless network A, the storage apparatus management section 4f that detects whether or not the public region RO of the storage apparatus 10 is accessible, and the wireless communication control section 4e that controls the operation of the wireless communication section 2.

The storage apparatus management section 4f is configured to be able to identify a unique identifier ID assigned to each individual storage apparatus 10 and store the identifier ID for a predetermined period. As described above, in the present embodiment, the period during which the storage apparatus management section 4f stores an identifier ID is a period after the power to the information communication apparatus 1 is switched on until the power is switched off.

When the identifier ID assigned to the connected detachable storage apparatus is not stored in the storage apparatus management section 4f, the wireless communication control section 4e automatically stops the wireless communication section 2. On the other hand, when the identifier ID assigned to the connected detachable storage apparatus is stored in the storage apparatus management section 4f, the wireless communication control section 4e automatically causes the wireless communication section 2 to operate.

Therefore, in the information communication apparatus 1 of the present embodiment, for example, when the automatic changeover mode is selected and the detachable storage apparatus 10a provided with the public region RO is connected, if the power is switched from off to on, since the identifier ID of the detachable storage apparatus 10a is not stored in the storage apparatus management section 4f, the wireless communication section 2 does not operate but remains stationary. This state is called a "state SA."

When the detachable storage apparatus 10a is removed from the information communication apparatus 1 in this state SA while maintaining the power-on state and the detachable storage apparatus 10b provided with a different public region RO is connected, since the identifier ID of the detachable storage apparatus 10b is not stored in the storage apparatus management section 4f, the wireless communication section 2 does not operate but remains stationary.

When the detachable storage apparatus 10a is removed from the information communication apparatus 1 in the state SA while maintaining the power-on state and the same detachable storage apparatus 10a is connected again, since the identifier ID of the detachable storage apparatus 10a is stored in the storage apparatus management section 4f, the wireless communication section 2 starts operating. This state is called a "state SB."

When the detachable storage apparatus 10a is removed from the information communication apparatus 1 in this state SB while maintaining the power-on state and the detachable storage apparatus 10b provided with a different public region RO is connected, since the identifier ID of the detachable storage apparatus 10b is not stored in the storage apparatus management section 4f, the wireless communication section 2 which is in operation is stopped.

As described above, even when the information communication apparatus 1 of the present embodiment selects an automatic changeover mode and a detachable storage apparatus provided with the public region RO is connected, if the detachable storage apparatus is connected for the first time after power is turned on, the wireless network A via the wireless communication section 2 is necessarily stopped. If the detachable storage apparatus provided with the public region RO is connected at a second time or later after power is turned on, the wireless network A via the wireless communication section 2 automatically operates.

When the wireless communication automatic changeover mode is selected, if, for example, the detachable storage apparatus 10a is connected, the wireless communication mode is switched to a safe mode in step S24. The wireless network A is stopped in step S08. The flow then proceeds to step S05 and the flow proceeds to step S02 if switching off of power is not instructed. In step S02, if the mode is a safe mode which is not the automatic changeover mode, the flow proceeds to step S03 in the same way as in the case of the manual changeover mode. When an instruction for starting wireless communication is outputted and at the same time the mode is a safe mode, the wireless communication mode is switched to the automatic changeover mode which is shown as step S10 and then the flow proceeds to step S07. On the other hand, in the case of the manual changeover mode, the flow proceeds to step S07 without switching the wireless communication mode as described above.

Thus, when the detachable storage apparatus is connected for the first time after power to the information communication apparatus 1 is turned on, by stopping the wireless network A via the wireless communication section 2, it is possible to prevent a file stored in the detachable storage apparatus, for example, a file forgotten to be erased by the user from being disclosed on the wireless network against the user's will.

Furthermore, as in the case of the first embodiment and the second embodiment, when the public region RO is inaccessible, the information communication apparatus 1 of the present embodiment does not operate the wireless network via the wireless communication section 2, and can thereby avoid operation of the wireless network via the wireless communication section 2 while there is no file that can be disclosed on the wireless network, and reduce power consumption. The image pickup apparatus 100 provided with the information communication apparatus 1 of the present embodiment also has the aforementioned effects.

(Fourth Embodiment)

Next, a fourth embodiment of the present invention will be described. Note that only differences from the first embodiment and the second embodiment will be described below and components identical to those of the first embodiment and the second embodiment will be assigned identical reference numerals and description thereof will be omitted as appropriate.

The storage apparatus management section 4f of the information communication apparatus 1 of the present embodiment is configured to be able to identify each individual storage apparatus 10 connected to the storage apparatus connection section 3. More specifically, the storage apparatus management section 4f is configured to be able to recognize a unique identifier ID assigned to each individual storage apparatus 10, recognize an identifier ID and store the identifier ID or information corresponding to the identifier ID.

The unique identifier ID assigned to the storage apparatus 10 is, for example, a serial number defined by the manufacturer of the storage apparatus 10 and is stored in a non-rewritable (non-volatile) storage region of the storage apparatus 10. Note that the identifier ID is not limited to the one defined by the manufacturer of the storage apparatus 10, and may be one generated by the information communication apparatus 1 and stored in the storage region of the storage apparatus 10.

The identifier ID or information corresponding to the identifier ID of the storage apparatus 10 recognized by the storage apparatus management section 4f is stored in a non-volatile storage section such as a flash memory provided for the control section 4. In the present embodiment, the identifier ID or information corresponding to the identifier ID is stored in a Wi-Fi authorized storage apparatus table in the storage section based on the identifier IDs or information corresponding to the identifier IDs of the storage apparatuses 10 recognized by the storage apparatus management section 4f, for example.

The storage apparatus management section 4f compares the Wi-Fi authorized storage apparatus table with an identifier ID of the storage apparatus 10 currently connected to the current storage apparatus connection section 3 and determines whether or not the storage apparatus 10 currently connected to the storage apparatus connection section 3 is one connected in the past and authorized for Wi-Fi communication.

Note that the storage apparatus management section 4f may be enabled to delete and rewrite contents of the Wi-Fi authorized storage apparatus table based on an instruction from the user. For example, when the storage apparatus 10 currently connected to the storage apparatus connection section 3 is formatted, the corresponding information may be deleted from the Wi-Fi authorized storage apparatus table. For example, the storage apparatus management section 4f may delete information on the storage apparatus 10 for which a predetermined time, for example, 24 hours or one week, has elapsed after the latest connection about the contents of the Wi-Fi authorized storage apparatus table.

Operation of the information communication apparatus 1 of the present embodiment will be described with reference to a flowchart shown in FIG. 10.

Figure 10:
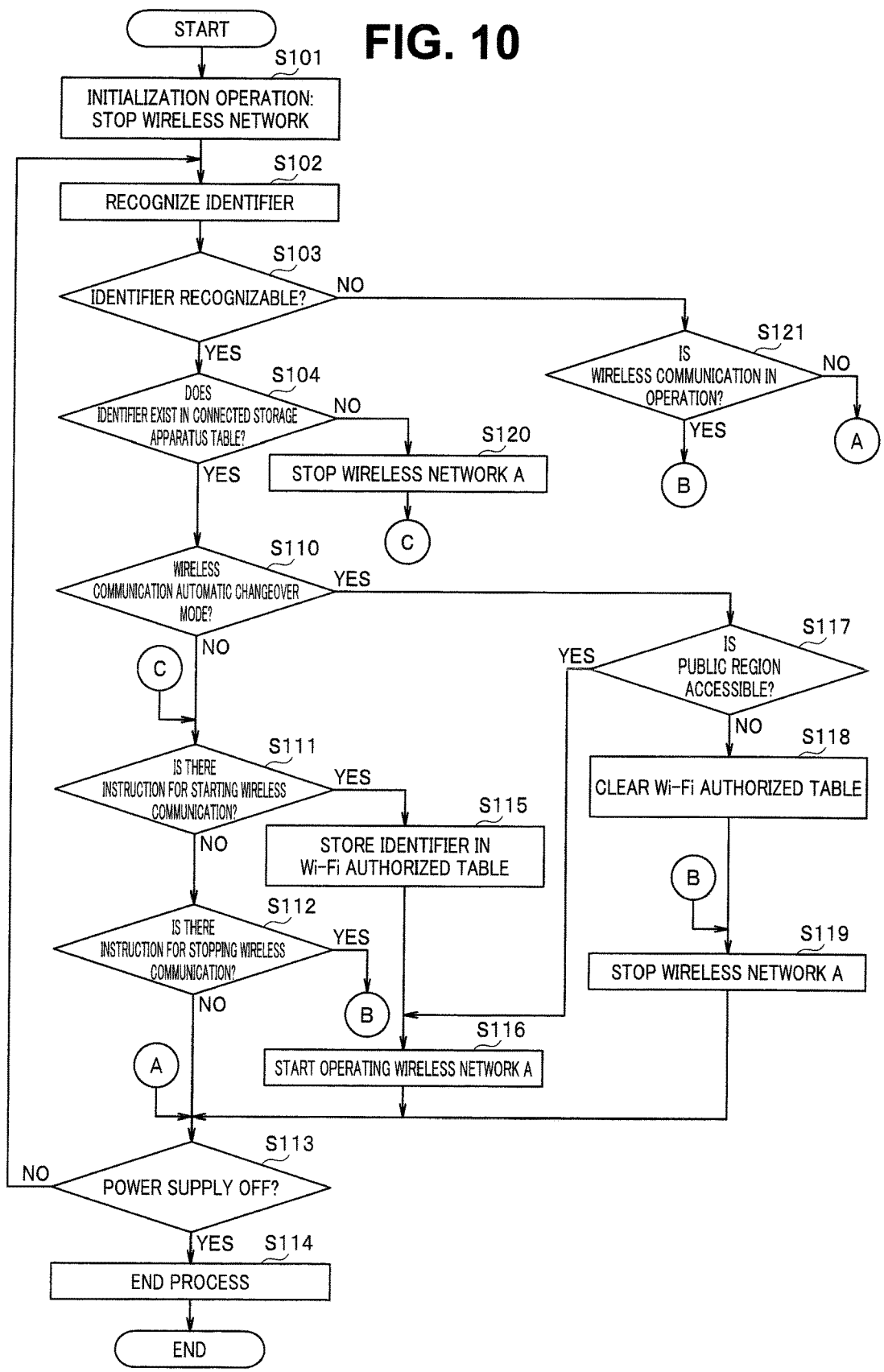
FIG. 10 is a flowchart illustrating operation of an information communication apparatus according to a fourth embodiment.

The processing shown in FIG. 10 is started when a power supply to the information communication apparatus 1 from the power supply section 14 starts. In the present embodiment, the power supply to the information communication apparatus 1 from the power supply section 14 is started, for example, when the user operates the power supply operation switch 7a, for example.

First, in step S101, an initialization operation necessary to start each section making up the information communication apparatus 1 is executed. In the present embodiment, the wireless communication section 2 is stopped in a state in which the initialization operation in step S101 is completed. That is, the wireless network A is stopped in a state in which the initialization operation in step S101 is completed.

Next, in step S102, an identifier ID of a storage apparatus 10 connected to the storage apparatus connection section 3 is recognized. In step S103, it is determined whether or not the identifier ID can be recognized. Note that when no storage apparatus 10 is connected to the storage apparatus connection section 3, it is determined that this is to be treated in the same way as when the identifier ID is unrecognizable.

In step S103, when it is determined that the identifier ID of the storage apparatus 10 connected to the storage apparatus connection section 3 is unrecognizable, the flow proceeds to step S121 to determine whether or not the wireless communication section 2 is in operation.

In step S121, when the wireless communication section 2 is in operation, the flow proceeds to step S119 to stop operation of the wireless communication section 2 and stop the wireless network. The flow then proceeds to step S113.

The state in which the flow moves from step S121 to step S119 corresponds to a case where the storage apparatus 10 is attached to the information communication apparatus 1 when the wireless communication section 2 is in operation.

When the wireless communication section 2 is not in operation in the determination in step S121, the flow proceeds to step S113. The state in which the flow moves from step S121 to step S113 corresponds to a case where the storage apparatus 10 is attached to the information communication apparatus 1 when the wireless communication section 2 is stopped.

In step S113, it is determined whether or not an instruction for switching off the power to the information communication apparatus 1 is inputted. In the present embodiment, an instruction for switching off the power to the information communication apparatus 1 is inputted when the user operates the power supply operation switch 7a, for example.

Note that the instruction for switching off the power to the information communication apparatus 1 may be automatically generated by the control section 4 when the control section 4 determines that a predetermined condition is satisfied. For example, when the operation portion 7 is not operated for a predetermined time or longer or when a predetermined signal is inputted via the external apparatus interface 5, the control section 4 may generate an instruction for switching off the power to the information communication apparatus 1.

When it is determined in step S113 that no instruction for switching off the power to the information communication apparatus 1 is inputted, the flow returns to step S102. That is, the system waits with the wireless communication section 2 remaining stopped until the storage apparatus 10 whose identifier ID is recognizable is connected to the storage apparatus connection section 3 or the user inputs some instruction.

In step S113, when the power supply operation switch 7a is operated and it is determined that an instruction for switching off the power to the information communication apparatus 1 is inputted, the flow proceeds to step S114 and executes an end process to switch off the power to the information communication apparatus 1. In this power switching off process in step S114, the wireless communication section 2 is also stopped.

On the other hand, when it is determined in step S103 that the identifier ID of the storage apparatus 10 connected to the storage apparatus connection section 3 is recognizable, the flow proceeds to step S104. In step S104, it is determined whether or not the identifier ID of the storage apparatus 10 recognized in step S102 already exists in the Wi-Fi authorized storage apparatus table.

In step S104, when it is determined whether or not the identifier ID of the storage apparatus 10 recognized in step S102 already exists in the Wi-Fi authorized storage apparatus table, the flow proceeds to step S110. In other words, when the connection apparatus 10 which is one connected in the past and authorized for disclosure of a file via the wireless communication section 2 is connected to the storage apparatus connection section 3, the flow proceeds to step S110.

It is determined in step S110 whether or not the automatic changeover mode is selected by the wireless communication changeover operation selection switch 7c. When it is determined that the automatic changeover mode which automatically determines whether or not to operate the wireless communication section 2 is not selected by the wireless communication changeover operation selection switch 7c, the flow proceeds to step S111. In other words, when the manual changeover mode is selected by the wireless communication changeover operation selection switch 7c, the flow proceeds to step S111.

In step S111, the wireless communication changeover switch 7b is operated and it is determined whether or not an instruction for starting operation of the wireless communication section 2 is inputted. The instruction for starting operation of the wireless communication section 2 is namely an instruction for starting the wireless network. When it is defined in step S111 that an instruction for starting operation of the wireless communication section 2 is not inputted, the flow proceeds to step S112.

In step S112, the wireless communication changeover switch 7b is operated and it is determined whether or not an instruction for stopping the wireless communication section 2 is inputted. The instruction for stopping the wireless communication section 2 is namely an instruction for stopping the wireless network. When it is determined in step S112 that no instruction for stopping the wireless communication section 2 is inputted, the flow proceeds to step S113.

As described above, step S113 is a step of determining whether or not an instruction for switching off the power to the information communication apparatus 1 is inputted. Therefore, when the storage apparatus 10 which is one connected in the past is connected to the storage apparatus connection section 3 and the manual changeover mode is selected by the wireless communication changeover operation selection switch 7c, the system waits until the wireless communication changeover switch 7b or the power supply operation switch 7a is operated. Here, when the power supply operation switch 7a is operated (step S113: YES), an end process of switching off the power to the information communication apparatus 1 is executed as described above.

When the wireless communication changeover switch 7b is operated and it is determined that an instruction for starting operation of the wireless communication section 2 is inputted (step S111: YES), the flow proceeds to step S115. In step S115, the identifier ID of the storage apparatus 10 recognized in step S102 is stored in the Wi-Fi authorized storage apparatus table. Next, the flow proceeds to step S116 to start operation of the wireless communication section 2. That is, the wireless network is started. The flow proceeds to step S113 after executing step S116.

When the wireless communication changeover switch 7b is operated and it is determined that an instruction for stopping the wireless communication section 2 is inputted (step S112: YES), the flow proceeds to step S119. In step S119, the wireless communication section 2 is stopped. That is, the wireless network is stopped. The flow proceeds to step S113 after executing step S119.

As described above, when the storage apparatus 10 which is one connected in the past is connected to the storage apparatus connection section 3 and the manual changeover mode is selected by the wireless communication changeover operation selection switch 7c, whether or not to operate the wireless communication section 2 is selected based on manual input of an instruction from the user using the wireless communication changeover switch 7b.

When it is determined that the automatic changeover mode is selected by the wireless communication changeover operation selection switch 7c in the determination in step S110, the flow proceeds to step S117.

In step S117, the storage apparatus management section 4f determines whether or not the public region RO of the storage apparatus 10 is accessible via the storage apparatus connection section 3 or whether or not an electronic file in the public region RO is accessible.

When it is determined in step S117 that the public region RO of the storage apparatus 10 is accessible via the storage apparatus connection section 3, the flow proceeds to step S116 to start operation of the wireless communication section 2. That is, the wireless network is started. The flow proceeds to step S113 after executing step S116.

When it is determined in step S117 that the public region RO of the storage apparatus 10 is inaccessible via the storage apparatus connection section 3, the flow proceeds to step S118. In step S118, the identifier of the connected storage apparatus 10 is deleted from the Wi-Fi authorized storage apparatus table. The flow proceeds to step S119 to stop operation of the wireless communication section 2. That is, the wireless network is stopped. The flow proceeds to step S113 after executing step S119.

As described above, when the storage apparatus 10 which is one authorized for Wi-Fi in the past is connected to the storage apparatus connection section 3 and the automatic changeover mode is selected by the wireless communication changeover operation selection switch 7c, whether or not to operate the wireless communication section is switched based on whether or not the storage apparatus 10 is provided with the public region RO. More specifically, the operation of the wireless communication section 2 is started if the storage apparatus 10 provided with the public region RO is connected and the wireless communication section 2 is stopped if the storage apparatus 10 not provided with the public region RO is connected.

In step S104, when it is determined that the identifier ID of the storage apparatus 10 recognized in step S102 does not exist in the Wi-Fi authorized storage apparatus table, the flow proceeds to step S120. In other words, when the storage apparatus 10 which is one which has never been connected in the past is connected to the storage apparatus connection section 3 for the first time, the flow proceeds to step S120. In step S120, the wireless communication section 2 is stopped. That is, the wireless network is stopped. The flow proceeds to step S111 after executing step S120.

As described above, if the currently connected detachable storage apparatus is one which has never been connected to the information communication apparatus 1 in the past, the wireless communication section 2 is stopped and the operation of the wireless communication section 2 is not started until the user inputs an instruction for starting operation of the wireless communication section 2. That is, in the initial connection of the storage apparatus 10 to the information communication apparatus 1, even when the automatic changeover mode is selected by the wireless communication changeover operation selection switch 7c, active operation by the user is required to start operation of the wireless communication section 2. This urges the user to confirm whether or not to start operation of the wireless communication section 2.

As described above, the information communication apparatus 1 of the present embodiment is configured by including the wireless communication section 2 configured to be communicable with an external device via the wireless network A assigned identification information of SSID-A and the wireless network B assigned identification information of SSID-B, the storage apparatus connection section 3 that performs input/output with the storage apparatus 10, and the control section 4.

The control section 4 is configured by including the storage region management section 4c configured to provide the storage apparatus 10 with the public region RO that discloses a file on the wireless network A and the non-public region RC that does not disclose any file on the wireless network A, the storage apparatus management section 4f that detects whether or not the public region RO of the storage apparatus 10 is accessible, and the wireless communication control section 4e that controls the operation of the wireless communication section 2.

For example, as shown in FIG. 5, when the detachable storage apparatus 10a provided with the public region RO is connected and the detachable storage apparatus 10a is given by the user authorization for disclosing a file via the wireless network A, the wireless communication control section 4e automatically operates the wireless networks A and B via the wireless communication section 2. When the detachable storage apparatus 10a is removed from the information communication apparatus 1, the wireless communication control section 4e automatically stops the wireless network A via the wireless communication section 2.

For example, as shown in FIG. 6, when the detachable storage apparatus 10b not provided with the public region RO is connected, the public region RO is inaccessible, and so the wireless communication control section 4e stops the wireless network A via the wireless communication section 2. In other words, when the public region RO is inaccessible, the wireless communication control section 4e is configured not to operate the wireless network A via the wireless communication section 2.

When the detachable storage apparatus 10a or 10b is connected for the first time or when disclosure of a file via the wireless network A is not authorized by the user, the wireless communication control section 4e stops the wireless networks A and B irrespective of whether or not the public region RO is provided.

Thus, when the public region RO is inaccessible, the wireless network via the wireless communication section 2 is stopped, and so the present embodiment can avoid operation of the wireless network via the wireless communication section 2 when there is no file that can be disclosed on the wireless network, and can thereby reduce power consumption.

When the storage apparatus 10 provided with the public region RO in which disclosure of a file is authorized by the user is connected to the storage apparatus connection section 3, the information communication apparatus 1 of the present embodiment automatically starts operation of the wireless network via the wireless communication section 2 and starts disclosure of the file on the wireless network, and can thereby save the labor of the user.

When the storage apparatus 10 for which disclosure of a file is not authorized by the user is connected, the information communication apparatus 1 of the present embodiment stops the wireless network, and can thereby prevent an erroneous connection of the storage apparatus 10 storing a file desired by the user not to be disclosed and prevent the file from being mistakenly disclosed against the user's will. The storage apparatus 10 for which disclosure of a file is not authorized by the user is, for example, a storage apparatus 10 which has never been connected to the information communication apparatus 1 in the past.

When a storage apparatus 10 for which disclosure of a file is not authorized by the user is connected, the information communication apparatus 1 of the present embodiment requires authorization by the user before starting operation of the wireless network. By requiring authorization by the user before starting operation of the wireless network in this way, it is possible to urge the user to confirm whether or not the storage contents of the currently connected storage apparatus 10 can be disclosed on the wireless network.

The above-described image pickup apparatus 100 provided with the information communication apparatus 1 of the present embodiment can also prevent a file from being mistakenly disclosed on the network against the user's will.

Figure 11:
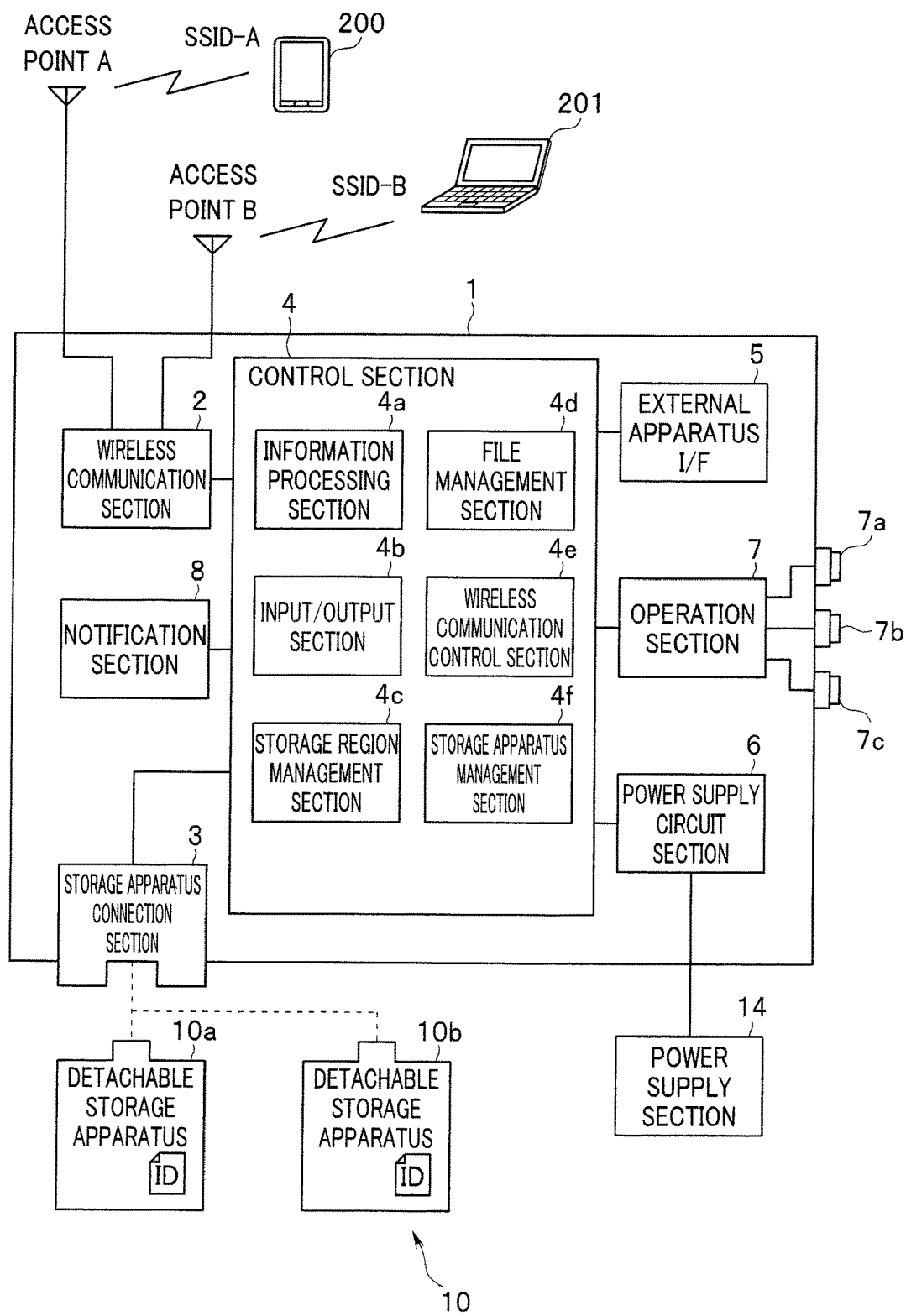
FIG. 11 is a diagram illustrating a modification of the information communication apparatus according to the fourth embodiment.

Note that the information communication apparatus 1 may be provided with a notification section 8 as shown in FIG. 11 as a modification. The notification section 8 is a region that notifies the user, using at least one of methods of light emission, character display, image display, pronunciation and vibration, that the currently connected storage apparatus 10 is one which has never been connected to the information communication apparatus 1 in the past.

The configuration of the notification section 8 is not particularly limited. The notification section 8 is provided with an LED when it adopts a mode of notification by means of light emission, for example. The notification section is provided with an image display apparatus such as a liquid crystal display device or organic EL display apparatus when it adopts a mode of notification by means of character display or image display, for example. The notification section is provided with a speaker when it adopts a mode of notification by means of pronunciation, for example. The notification section is provided with an electric motor when it adopts a mode of notification by means of vibration, for example. The notification section 8 may be provided with a combination of a plurality of these modes.

The information communication apparatus 1 provided with the notification section 8 allows the user to more reliably recognize that the currently connected storage apparatus 10 is one which has never been connected to the information communication apparatus 1 in the past.

Note that the present invention is not limited to the aforementioned embodiments, but can be modified as appropriate without departing from the spirit and scope or thought of the present invention that can be read from the scope of claims and the entire specification, and the information communication apparatus accompanied by such a modification is also included in the technological scope of the present invention.

For example, the aforementioned first to fourth embodiments use wireless LAN as communication means between the information communication apparatus 1 and the external device 200 or 201, but wired LAN or WAN (wide area network) may be used for a part or whole of communication means between the information communication apparatus 1 and the external device 200 or 201.

The aforementioned first to fourth embodiments use an infrastructure mode for a wireless LAN connection between the information communication apparatus 1 and the external device 200 or 201, but this may be an ad hoc mode.

The information communication apparatus according to the present invention is not limited to the modes of the image pickup apparatus described in the aforementioned embodiments, but is applicable to various electronic devices provided with, for example, a wireless communication function. Examples of the electronic devices provided with a wireless communication function include a flash memory card, a portable storage, a portable communication terminal, a sound recording device, a game machine or a digital media player.

What is claimed is:

1. An information communication apparatus comprising:
a communication section that is communicable with one or a plurality of external devices via one or a plurality of wireless network channels and assigns a different piece of identification information to the one or each of the plurality of wireless network channels;

a storage apparatus connection section that changes whether or not to make a connection with one or a plurality of storage apparatuses configured to store an electronic file and perform inputting/outputting with the storage apparatus;

a storage region management section that provides, in the storage apparatus, a public region in which the electronic file is disclosed to a wireless network channel assigned with a predetermined piece of identification information among the one or each of the plurality of wireless network channels;

a storage apparatus management section that detects whether or not the public region is accessible via the storage apparatus connection section; and a communication control section configured to cause, when the storage apparatus management section determines that the public region is accessible, the wireless network channel assigned with the predetermined piece of identification information to operate, cause, when the storage apparatus management section determines that the public region is inaccessible, the wireless network channel assigned with the predetermined piece of identification information not to operate, and cause, when the storage apparatus is connected to the storage apparatus connection section for a first time, the wireless network channel assigned with the predetermined piece of identification information not to operate irrespective of the determination of the storage apparatus management section.

2. The information communication apparatus according to claim 1, wherein the storage apparatus management section recognizes a unique identifier assigned to the storage apparatus and store the identifier, and the communication control section determines, when the identifier of the storage apparatus connected to the storage apparatus connection section is not stored in the storage apparatus management section, that the storage apparatus is connected for the first time.

3. An information communication method using an information communication apparatus comprising:

a communication section that is communicable with one or a plurality of external devices via one or a plurality of network channels and assigns a different piece of identification information to the one or each of the plurality of wireless network channels;

a storage apparatus connection section that changes whether or not to make a connection with one or a plurality of storage apparatuses configured to store an electronic file and perform inputting/outputting with the storage apparatus; and a storage region management section that provides, in the storage apparatus, a public region in which the electronic file is disclosed to a wireless network channel assigned with a predetermined piece of identification information among the one or each of the plurality of wireless network channels, the method comprising:

a step of detecting whether or not the storage apparatus is connected to the storage apparatus connection section for a first time;

a step of detecting whether or not the public region is accessible via the storage apparatus connection section; and a step of causing, when the storage apparatus is connected to the storage apparatus connection section for the first time, the wireless network channel assigned with the predetermined piece of identification information not to operate, causing, when the storage apparatus is not connected to the storage apparatus connection section for the first time and the public region is accessible, the wireless network channel assigned with the predetermined piece of identification information to operate, and causing, when the storage apparatus is not connected to the storage apparatus connection section for the first time and the public region is inaccessible, the wireless network channel assigned the predetermined identification information not to operate.

4. A non-transitory storage medium storing a program that stores a program for controlling an information communication apparatus comprising:

a communication section that is communicable with one or a plurality of external devices via one or a plurality of wireless network channels and assigns a different piece of identification information to the one or each of the plurality of wireless network channels;

a storage apparatus connection section that changes whether or not to make a connection with one or a plurality of storage apparatuses configured to store an electronic file and perform input/output with the storage apparatus; and a storage region management section that provides, in the storage apparatus, a public region in which the electronic file is disclosed to a wireless network channel assigned with a predetermined piece of identification information among the one or each of the plurality of wireless network channels, the program comprising:

a step of detecting whether or not the storage apparatus is connected to the storage apparatus connection section for a first time;

a step of detecting whether or not the public region is accessible via the storage apparatus connection section; and a step of causing, when the storage apparatus is connected to the storage apparatus connection section for the first time, the wireless network channel assigned with the predetermined piece of identification information not to operate, causing, when the storage apparatus is not connected to the storage apparatus connection section for the first time and the public region is accessible, the wireless network channel assigned the predetermined identification information to operate, and causing, when the storage apparatus is not connected to the storage apparatus connection section for the first time and the public region is inaccessible, the wireless network channel assigned with the predetermined piece of identification information not to operate.

* * * * *